US012643713B2

(12) United States Patent
Tonelli

(10) Patent No.: US 12,643,713 B2
(45) Date of Patent: Jun. 2, 2026

(54) SET OF TRANSPORTABLE CONTAINERS

(71) Applicant: G.T. LINE—S.R.L., Valsamoggia (IT)

(72) Inventor: Massimo Tonelli, Bologna (IT)

(73) Assignee: G.T. LINE—S.R.L., Valsamoggia (IT)

( * ) Notice: Subject to any disclaimer, the term of this patent is extended or adjusted under 35 U.S.C. 154(b) by 92 days.

(21) Appl. No.: 18/577,920

(22) PCT Filed: Jul. 9, 2021

(86) PCT No.: PCT/IT2021/000034

§ 371 (c)(1),
(2) Date: Jan. 9, 2024

(87) PCT Pub. No.: WO2023/281540

PCT Pub. Date: Jan. 12, 2023

(65) Prior Publication Data

US 2024/0351744 A1 Oct. 24, 2024

(51) Int. Cl.
*B65D 21/02* (2006.01)
*A45C 5/00* (2006.01)
(Continued)

(52) U.S. Cl.
CPC ............ *B65D 21/0223* (2013.01); *A45C 5/00* (2013.01); *B25H 3/02* (2013.01); *B25H 3/021* (2013.01);
(Continued)

(58) Field of Classification Search
CPC ... A45C 5/00; B25H 1/04; B25H 3/02; B25H 3/021; B25H 3/028; B25H 3/027;
(Continued)

(56) References Cited

U.S. PATENT DOCUMENTS 1,642,612 A * 9/1927 Cato ......................... E05C 3/14 292/128
2,671,683 A * 3/1954 Heyman ............. E05B 65/0007 292/205
(Continued)

FOREIGN PATENT DOCUMENTS

DE 102015013053 A1 4/2017
EP 4101599 A1 * 12/2022 ............... B25H 3/02
KR 20210069159 A 6/2021

OTHER PUBLICATIONS

International Search Report for International Application No. PCT/IT2021/000034, dated Apr. 12, 2022, 3 pages.
(Continued)

*Primary Examiner* — Gideon R Weinerth
(74) *Attorney, Agent, or Firm* — CANTOR COLBURN LLP

(57) ABSTRACT

A set of transportable containers, including at least two transportable containers, each one of the type of a suitcase, a trunk, a chest, a trolley case and the like.
The set includes elements for the mutual retention of the containers, which can be actuated in at least one stacking configuration wherein a bottom of a first container is rested in parallel on a lid of a second container in a specific mutual and active arrangement. The elements for mutual retention are selectively deactivatable in order to allow the mutual spacing apart of the containers.

4 Claims, 42 Drawing Sheets

(51) Int. Cl.
*B25H 3/00* (2006.01)
*B25H 3/02* (2006.01)
*B65D 21/032* (2006.01)

(52) U.S. Cl.
CPC .......... *B25H 3/026* (2013.01); *B65D 21/0204* (2013.01); *B65D 21/0212* (2013.01); *B65D 21/023* (2013.01)

(58) Field of Classification Search
CPC . B25H 3/06; B25H 3/16; B25H 3/022; B25H 3/026; B62B 2202/12; B65D 21/0223; B65D 21/0212; B65D 21/0204; B65D 21/0214; B65D 21/0222; B65D 21/0224; B65D 21/023; Y10T 292/1062
USPC .............................. 206/508; 292/8, 205, 238
See application file for complete search history.

(56) References Cited

U.S. PATENT DOCUMENTS

| | | | | |
|---|---|---|---|---|
| 3,552,817 | A * | 1/1971 | Marcolongo | A47B 87/02 312/107 |
| 3,999,818 | A * | 12/1976 | Schankler | G11B 23/0236 312/107 |
| 4,863,222 | A * | 9/1989 | Posso | A47B 87/0292 312/107 |
| 5,046,789 | A * | 9/1991 | Lee | A47B 87/0276 52/270 |
| 5,224,744 | A * | 7/1993 | Michelutti | B65F 1/1615 292/234 |
| 5,347,693 | A * | 9/1994 | Otrusina | A45F 5/02 24/3.12 |
| 5,452,544 | A * | 9/1995 | Weathington, Sr. | E05B 65/0007 292/228 |
| 5,518,282 | A * | 5/1996 | Sawada | E05B 17/2011 292/252 |
| 5,628,443 | A * | 5/1997 | Deutsch | A45F 3/00 190/110 |
| 5,775,046 | A * | 7/1998 | Fanger | A47B 87/007 108/158.12 |
| 5,890,613 | A * | 4/1999 | Williams | A45C 7/0045 220/23.4 |
| 6,786,372 | B2 * | 9/2004 | Enkerlin | A45F 5/02 455/100 |
| 7,690,856 | B2 * | 4/2010 | Mortensen | A01K 61/54 220/4.27 |
| 10,710,770 | B2 * | 7/2020 | Kögel | B65D 21/0212 |
| 10,870,513 | B2 | 12/2020 | Gonitianer et al. | |
| 11,884,456 | B2 * | 1/2024 | Whitmire | B65D 21/0209 |
| 11,964,632 | B2 * | 4/2024 | Rutman | B60P 7/0815 |
| 11,986,946 | B2 * | 5/2024 | Zhang | B25H 3/026 |
| 12,064,863 | B1 * | 8/2024 | Tsai | B25H 3/021 |
| 2003/0094392 | A1 * | 5/2003 | Meier | B65D 21/0213 206/503 |
| 2008/0280523 | A1 * | 11/2008 | Bishop | A63H 33/082 446/124 |
| 2010/0147642 | A1 | 6/2010 | Andochick | |
| 2016/0008972 | A1 | 1/2016 | Chen | |
| 2018/0220758 | A1 | 8/2018 | Burchia | |
| 2020/0078929 | A1 * | 3/2020 | Liu | B65D 21/0223 |
| 2020/0346819 | A1 * | 11/2020 | Kögel | B25H 3/02 |
| 2021/0221561 | A1 * | 7/2021 | Davidian | B65D 21/0224 |
| 2023/0122425 | A1 * | 4/2023 | Camp | B25H 3/021 |
| 2023/0150725 | A1 * | 5/2023 | Baron | B65D 21/023 206/509 |
| 2024/0208040 | A1 * | 6/2024 | Coons | B25H 3/023 |
| 2024/0278416 | A1 * | 8/2024 | Zhang | B65D 21/0228 |
| 2024/0351744 | A1 * | 10/2024 | Tonelli | B25H 3/02 |
| 2025/0066075 | A1 * | 2/2025 | Li | B25H 3/02 |
| 2025/0115392 | A1 * | 4/2025 | Li | B65D 21/0223 |
| 2025/0153903 | A1 * | 5/2025 | Maier | B65D 43/22 |
| 2025/0223079 | A1 * | 7/2025 | Hoppe | B25H 3/021 |
| 2025/0229944 | A1 * | 7/2025 | Williams | B65D 21/0223 |
| 2025/0236436 | A1 * | 7/2025 | Van Wyk | B65D 21/0224 |

OTHER PUBLICATIONS

Written Opinion for International Application No. PCT/IT2021/000034, dated Apr. 12, 2022, 5 pages.

European Search Report for Application No. 25168066.6, dated Jul. 18, 2025, 8 pages.

* cited by examiner

SET OF TRANSPORTABLE CONTAINERS

CROSS-REFERENCE TO RELATED APPLICATIONS

This application is a 35 U.S.C. § 371 National Stage patent application of PCT/IT2021/000034, filed on 9 Jul. 2021, the disclosure of which is incorporated herein by reference in its entirety.

TECHNICAL FIELD

The present disclosure relates to a set of transportable containers, of the type of suitcases, trunks, chests, trolley cases and the like.

BACKGROUND

The category of transportable containers comprises a heterogeneous range of embodiments, among which it is possible to find trunks, chests, suitcases, trolley cases, backpacks and more besides. These products are differentiated by shape, dimensions, materials and/or functionality, as well as by the intended use, the type of goods that can be accommodated and/or the target market.

Within this category, one segment of significant importance is certainly constituted by those products that are intended for technicians, maintenance staff and professionals in various sectors, who use them to safely transport equipment and instruments necessary for their work.

The great care required in transporting such objects, which are particularly sensitive to shocks and stresses, and also to humidity, to dust and to other contaminants, has led the manufacturing companies to develop containers that stand out for their strength and mechanical performance, while at the same time enriching them with additional features in order to optimize the use experience.

In this context, therefore, typically professional containers comprise a pair of half-shells which are mutually articulated, are made of a polymeric material that is sufficiently light but at the same time rigid and strong, so as to permit easy transport and at the same time ensure the capacity to transport a considerable weight and withstand impacts, including intense impacts, without undergoing deformations and especially without compromising the integrity of what is accommodated in the internal compartment.

Furthermore, in the closed configuration the internal compartment of the half-shells is effectively isolated by gaskets and/or via other contrivances that prevent the entry of air, water, humidity or dust.

Furthermore, accessories and components are often provided inside that subdivide the space into separate compartments or which in any case enable an ordered accommodation of the work instruments and/or offer a practical support for tablet computers and laptops.

Although larger containers can offer high capacity and therefore can accommodate a great number of tools and instruments, it is often necessary to use two or more containers, in order to accommodate all the equipment required by the specific task, or more simply in order to also transport objects for private use (items of clothing, personal effects, etcetera), for example when on an extended stay.

In all these contexts it is evidently preferable to be able to couple together the containers that are to be moved together, so as to make transport more convenient (especially when the user is transporting the containers manually) and/or in order to prevent impacts or drops (for example when the containers are accommodated in shipping containers or cargo holds).

To this end, usually improvised solutions are used, which are often laborious and which in any case do not ensure an adequately stable coupling. Occasionally, stacks of overlaid containers are wound around by a belt or enclosed in an enclosure made of polymeric material, so as to maintain the substantially vertical configuration during transport.

Such embodiments are also not devoid of drawbacks, however, in that the provision of an enclosure or the winding with a belt are often found to be laborious and difficult activities, which moreover do not provide any coupling between one container and the next, therefore leaving small possibilities of relative movements which can translate to unwanted impacts and rubbing or in any case render the stack unstable.

SUMMARY

The aim of the present disclosure is to solve the above mentioned problems, by providing a set of transportable containers that ensures convenient methods of stacking thereof.

Within this aim, the disclosure provides a set of transportable containers that ensures a stable and repeatable stacking thereof, while at the same time ensuring convenient methods of disengagement, when required, by the user.

the disclosure also provides a set that is versatile, and which ensures practical methods of stacking even for containers of different dimensions.

The disclosure further provides a set that ensures a high reliability of operation.

The disclosure provides a set that adopts an alternative technical and structural architecture to those of conventional sets.

the disclosure also provides a set that can be easily implemented using elements and materials that are readily available on the market.

the disclosure further provides a set that is of low cost and safely applied.

This aim and these and other advantages which will become better apparent hereinafter are achieved by providing a set of transportable containers, comprising at least two transportable containers, each one of the type of a suitcase, a trunk, a chest, a trolley case, and the like, characterized in that it comprises means for the mutual retention of said containers, which can be actuated in at least one stacking configuration wherein the bottom of a first said container is rested in parallel on the lid of a second said container in a specific mutual and active arrangement, said means being selectively deactivatable in order to allow the mutual spacing apart of said containers.

BRIEF DESCRIPTION OF THE DRAWINGS

Further characteristics and advantages of the disclosure will become better apparent from the description of some preferred, but not exclusive, embodiments of the set according to the disclosure, which are illustrated by way of non-limiting example in the accompanying drawings wherein:

FIG. 1 is a right-hand perspective front view from above of the set according to the disclosure in the stacking configuration, FIG. 2 is a right-hand perspective front view from below of a container of the set of FIG. 1, FIG. 3 is a left-hand perspective front view from below of the container of FIG. 2, without a component, FIGS. 4 and 5 are respectively right-hand and left-hand perspective front views from above of the container of FIG. 2, FIG. 6 is a front elevation view of the set in FIG. 1, FIG. 7 is a cross-sectional view of FIG. 6, taken along the line VII-VII, FIG. 8 is a view from above of the set in FIG. 1, FIGS. 9-12 are cross-sectional views of FIG. 8, taken respectively along the lines IX-IX, X-X, XI-XI and XII-XII;

FIG. 13 is a left-hand perspective front view from below of the set according to the disclosure in a possible mutual arrangement, FIG. 14 is a greatly enlarged detail of FIG. 13, FIG. 15 is a side view of the set in the configuration in FIG. 13, FIG. 16 is a cross-sectional view of FIG. 15, taken along the line XVI-XVI, FIG. 17 is a side view of the set in a different mutual arrangement, FIG. 18 is a cross-sectional view of FIG. 17, taken along the line XVIII-XVIII, FIG. 19 is a side view of the set in a further mutual arrangement, FIG. 20 is a cross-sectional view of FIG. 19, taken along the line XX-XX, FIG. 21 is a side view of the set in the stacking configuration, FIG. 22 is a cross-sectional view of FIG. 21, taken along the line XXII-XXII, FIG. 23 is the same detail as FIG. 14, with the set in the stacking configuration;

FIG. 24 is a right-hand perspective front view from above of the set according to the disclosure in the stacking configuration, FIG. 25 is a right-hand perspective front view from below of a container of the set of FIG. 24, FIG. 26 is a left-hand perspective front view from above of the container of FIG. 25, FIG. 27 is a view from above of the set in FIG. 24, FIGS. 28 and 29 are cross-sectional views of FIG. 27, taken respectively along the lines XXVIII-XXVIII and XXIX-XXIX;

FIG. 30 is a right-hand perspective front view from above of the set according to the disclosure, with two containers in mutual stacking configuration and a third container partially offset, FIGS. 31 and 32 are right-hand perspective front views from below of two different containers of the set of FIG. 1, FIG. 33 is a left-hand perspective front view from above of the container of FIG. 32, FIG. 34 is a side view of the set in FIG. 30, FIG. 35 is a view from above of the set in FIG. 30, FIG. 36 is a cross-sectional view of FIG. 35, taken along the line XXXVI-XXXVI;

FIG. 37 is a left-hand perspective front view from above of these components, arranged in the mutual stacking configuration of the containers and in the fifth embodiment, FIG. 38 is a partially exploded right-hand perspective front view of the components of FIG. 37, FIG. 39 is a view from above of the components of FIG. 37, FIG. 40 is a side view of the components of FIG. 37, FIGS. 41 and 42 are cross-sectional views of FIG. 40, taken respectively along the lines XLI-XLI and XLII-XLII;

FIG. 43 is a view of the components as in FIG. 37, in the sixth embodiment, FIG. 44 is a partially exploded right-hand perspective front view of the components of FIG. 43, and FIGS. 45 to 48 are schematic views of how the stacking configuration is obtained, in a seventh embodiment of the set according to the disclosure, shown partially and cross-sectioned along a plane at right angles to the bottoms and to the lids.

DETAILED DESCRIPTION OF THE DRAWINGS

Figure 13:
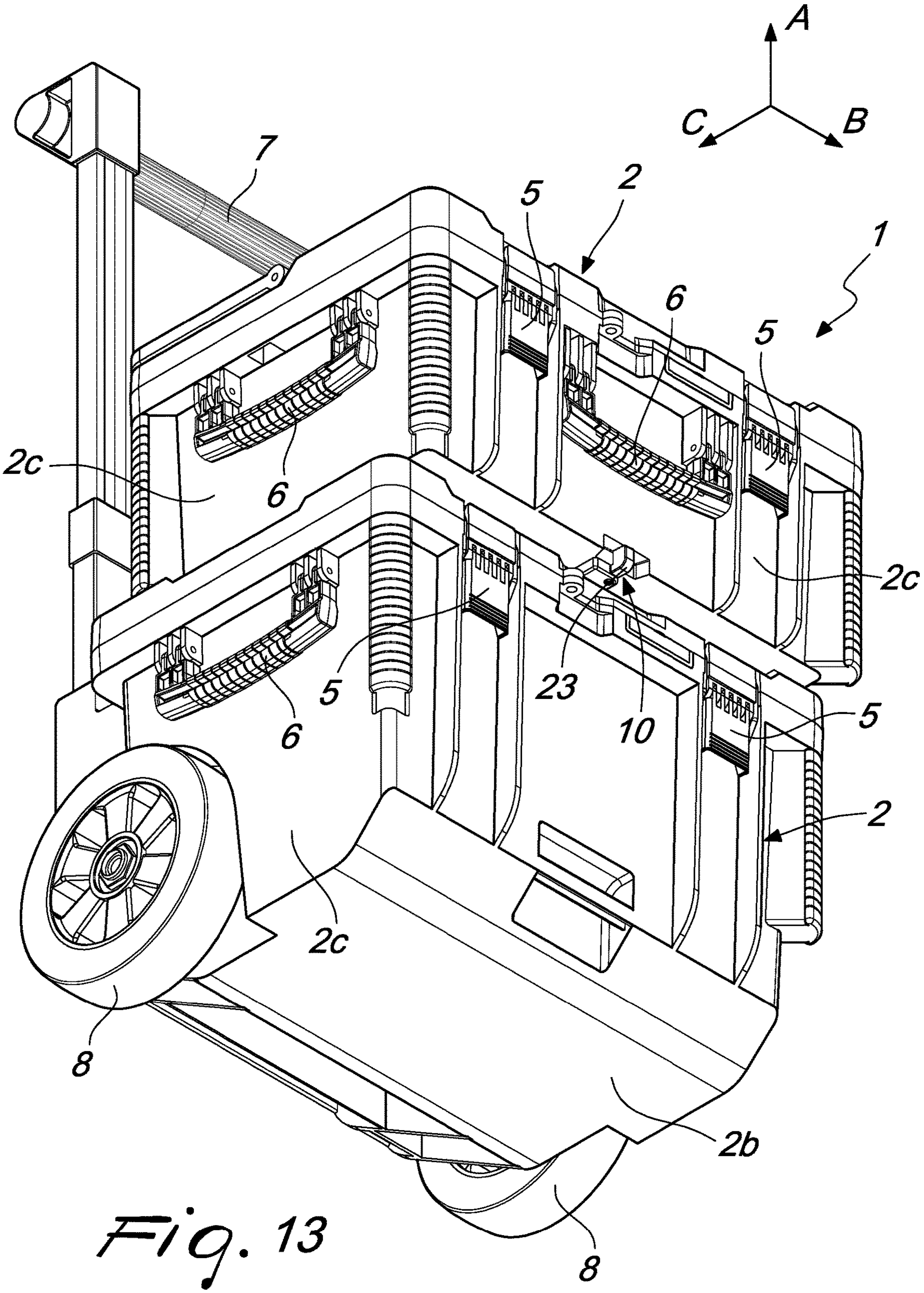
FIGS. 13 to 23 are views of the set according to the disclosure, in the second embodiment, more specifically.
Figure 14:
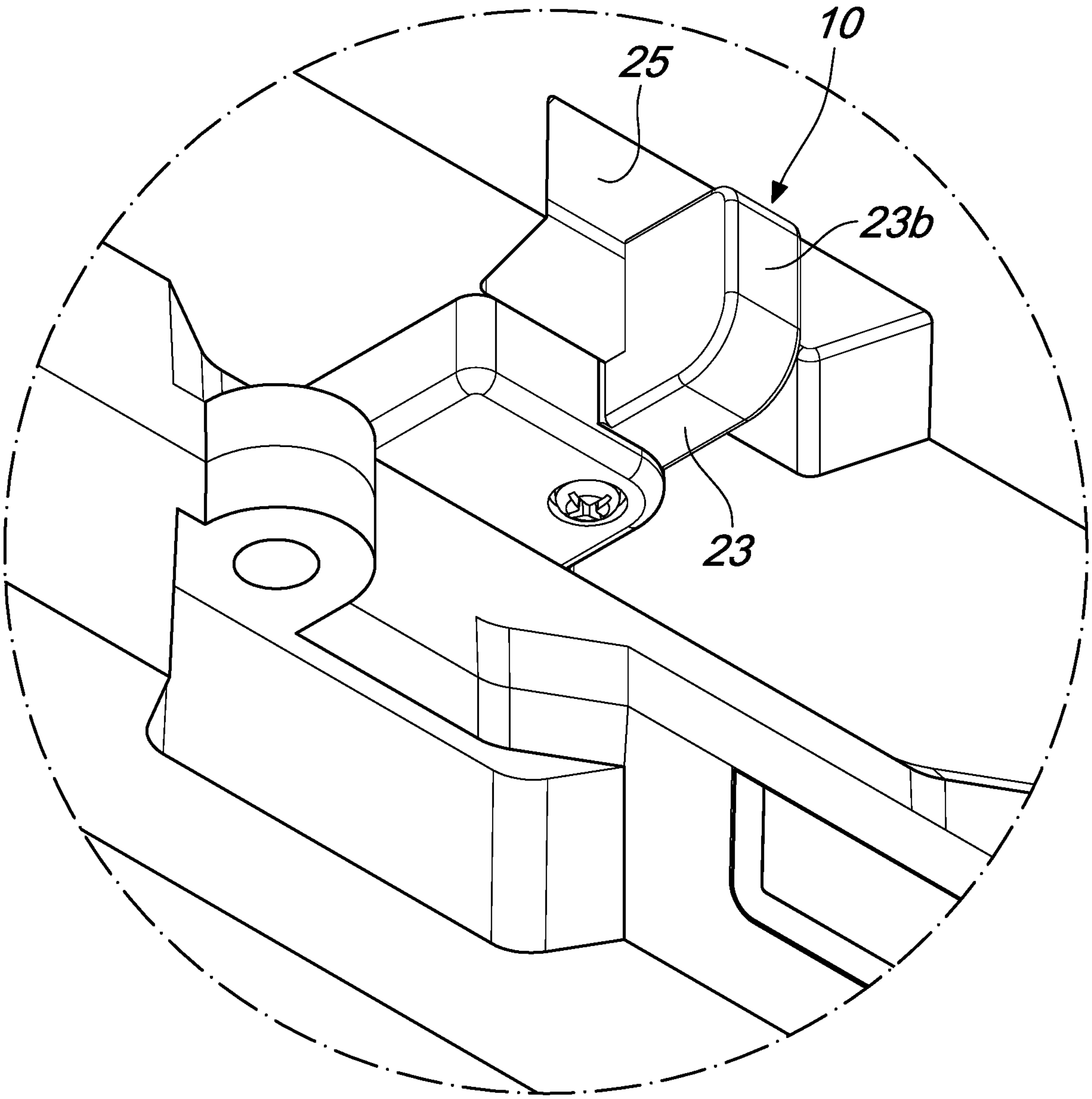
Figure 15:
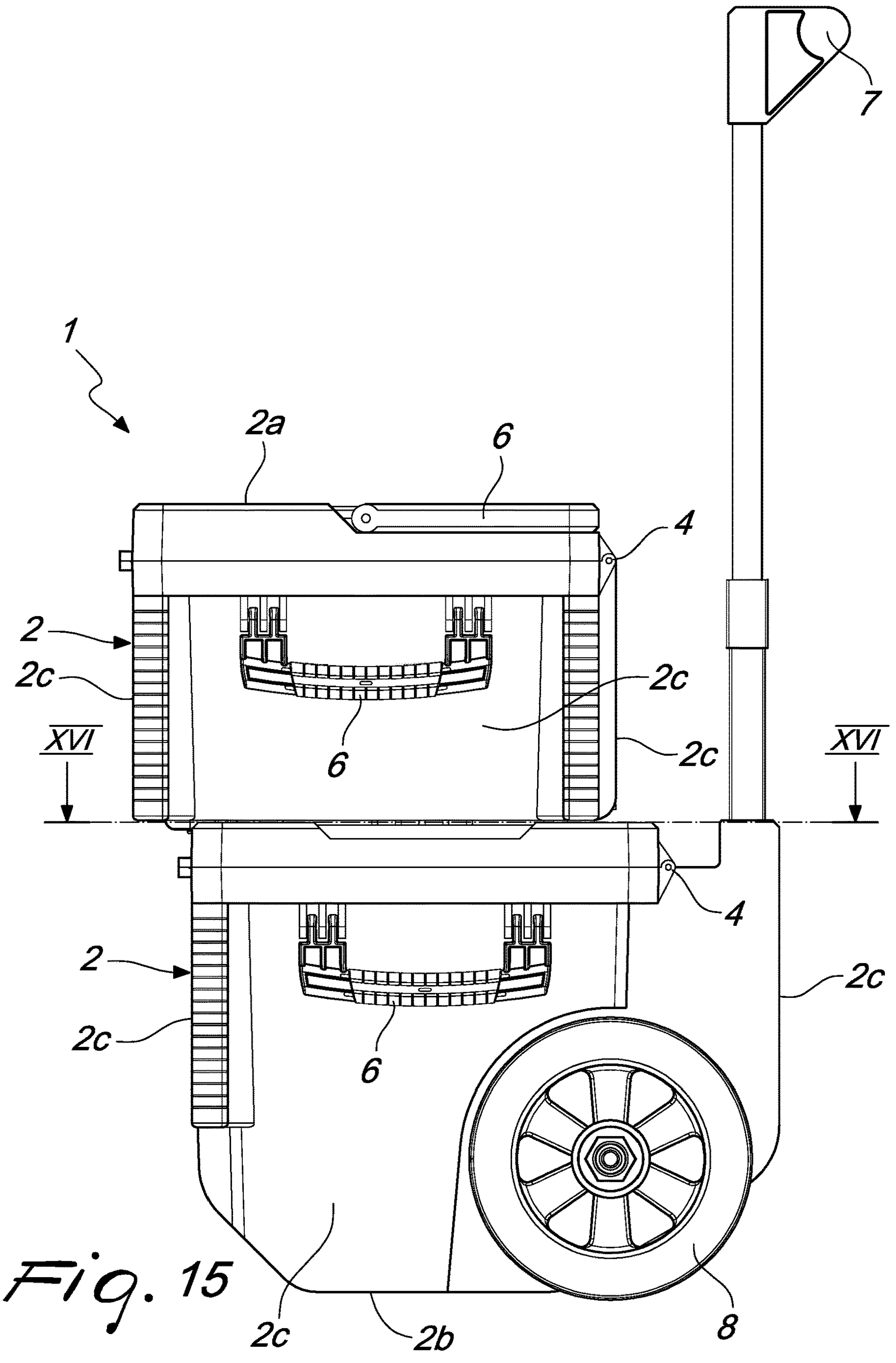

With reference to the figures, the reference numeral 1 generally designates a set of transportable containers 2. In more detail, it should be noted that the set 1 can comprise a number at will of containers 2 and in this sense, the different variants illustrated in the accompanying figures in fact show, by way of example, sets 1 with a different number of containers 2 (five containers in FIG. 1, two in FIG. 13, three in FIG. 24, etc.).

In any case, and while reiterating that the number of containers 2 comprised in the set 1 can be any, each one of them is chosen of the type of a suitcase, a trunk, a chest, a trolley case and the like.

More generally, each container 2 is any product (suitcase, trunk, chest, trolley case, backpack, pack, bag, etc.), made of any material, that is capable of accommodating (in an internal compartment 3) and transporting objects and tools of various types, both for private use and for professional purposes. While remaining within the scope of protection claimed herein, the container 2 can in fact be used to contain items of clothing, objects of various types and personal effects, for private use, and also tools, instruments, apparatuses, electronic equipment and more besides, for professional use.

In any case, in the preferred application (and in the accompanying figures), each container 2 comprises a rigid shell, which in fact delimits the internal compartment 3 and which (typically but not exclusively) is composed of two half-shells which are mutually articulated, have the same or different dimensions, are made of polymeric material with high resistance to shock, and are provided with adapted contrivances that ensure the complete hermetic seal of the internal compartment 3 and therefore have the capacity to prevent the entry of water, humidity, dust and contaminants in general.

Furthermore, each container 2 has typically a substantially box-like shape and therefore comprises a lid 2*a*, a bottom 2*b* and four side walls 2*c*, which in fact delimit the internal compartment 3 (for the sake of simplicity the reference numerals 2*a*, 2*b* and 2*c* have been indicated only in some figures). Furthermore, usually (and hence also in the accompanying figures), the container 2 is composed of a first half-shell, substantially parallelepiped in shape, and a second half-shell (flat or box-like in turn), which can move with respect to each other (usually by virtue of a hinge 4) between a closed configuration of the internal compartment 3 and at least one open configuration, of free access to this internal compartment 3.

The half-shells of the same container 2 can have substantially the same size, so as to constitute the two halves of the external shell that delimits the internal compartment 3, or they can have different shapes and dimensions (in particular, a different height).

Evidently, the lid 2*a* and the bottom 2*b* of a container 2 are part respectively of one and of the other half-shell, while each side wall 2*c* of a container 2 can be formed by the respective adjacent side walls of the two half-shells.

The contrivances that ensure the seal, like any other component (in addition to the hinges 4, there are for example the locks 5, the carrying handles 6, the telescopic handles 7, the wheels 8, etc.) or accessory, can be any and are chosen from those known in the background art according to the specific requirements.

According to the disclosure, the set 1 comprises means for the mutual retention of the containers 2, which can be actuated in at least one stacking configuration wherein the bottom 2*b* of a first container 2 is rested in parallel on the lid 2*a* of a second container 2 in a specific mutual and active arrangement.

Furthermore, according to the disclosure these means are selectively deactivatable in order to allow the mutual spacing apart of the containers 2.

It is emphasized that, in any mutually stacked pair of containers 2, by "first" container 2 what is meant here is the one arranged above, while the "second" container 2 is the one below the "first". The possibility is allowed for that, in any pair of containers 2, the means for retention uniquely identify the first and the second container 2 (in that only by arranging one of the two containers 2 over the other, and not conversely, it will be possible to obtain the desired stable stacking). Likewise, and hence for example in many of the containers 2 in the accompanying figures, each container 2 could be the upper one or the lower one, assuming in each instance the role of first or second container 2. Furthermore, such as for example in the embodiment of FIG. 1, the stack is composed of three or more containers 2: in such case, at least one container 2 arranged at an intermediate level is simultaneously the first container 2 (with respect to the underlying container) and the second container 2 (with respect to the overlying container).

Preferably, the stacking configuration corresponds to the configuration in which at least one (and even more preferably at least two or three) respective side walls 2*c* are in alignment.

Figure 24:
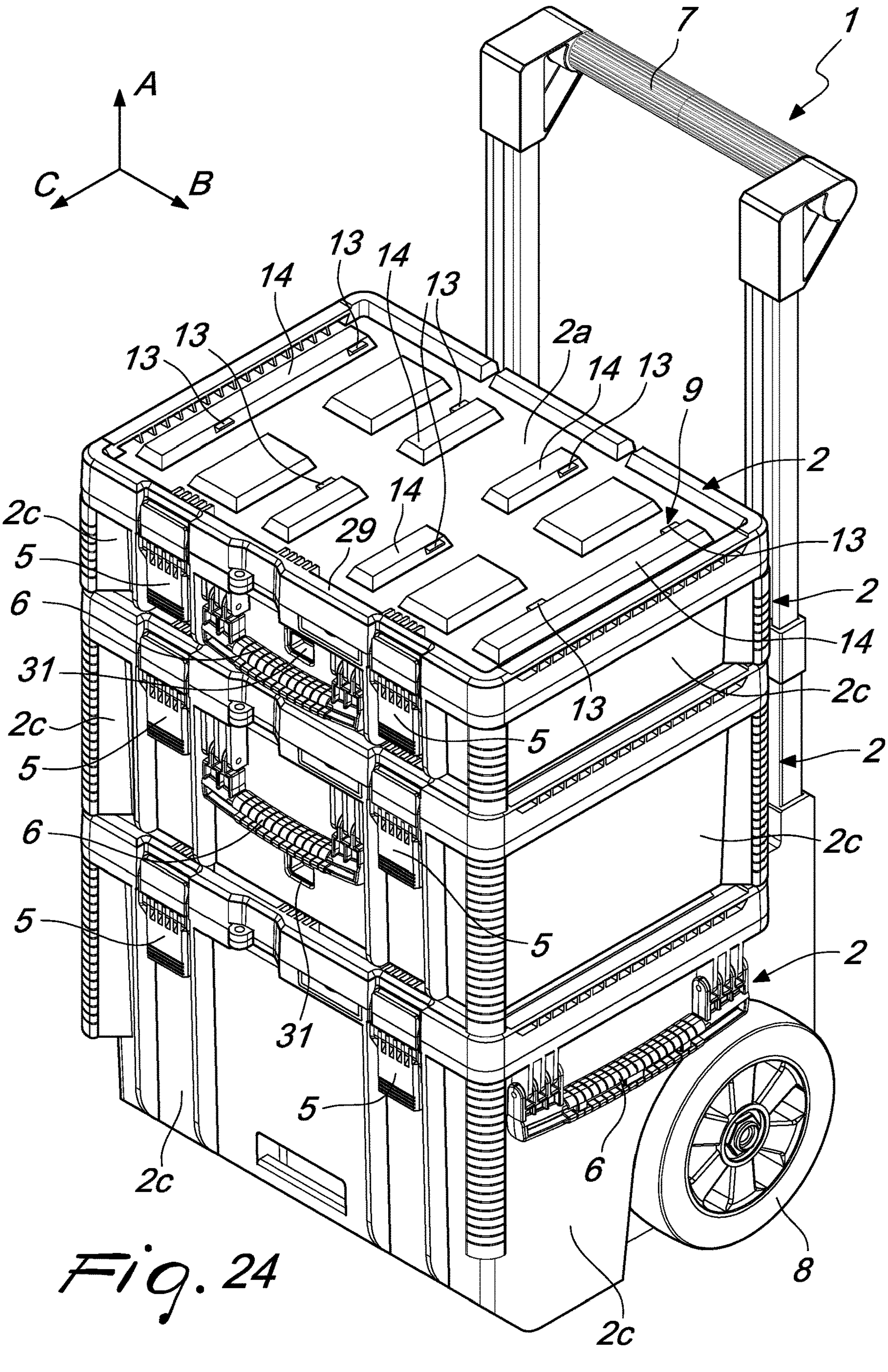
FIGS. 24 to 29 are views of the set according to the disclosure, in the third embodiment, more specifically.
Figure 25:
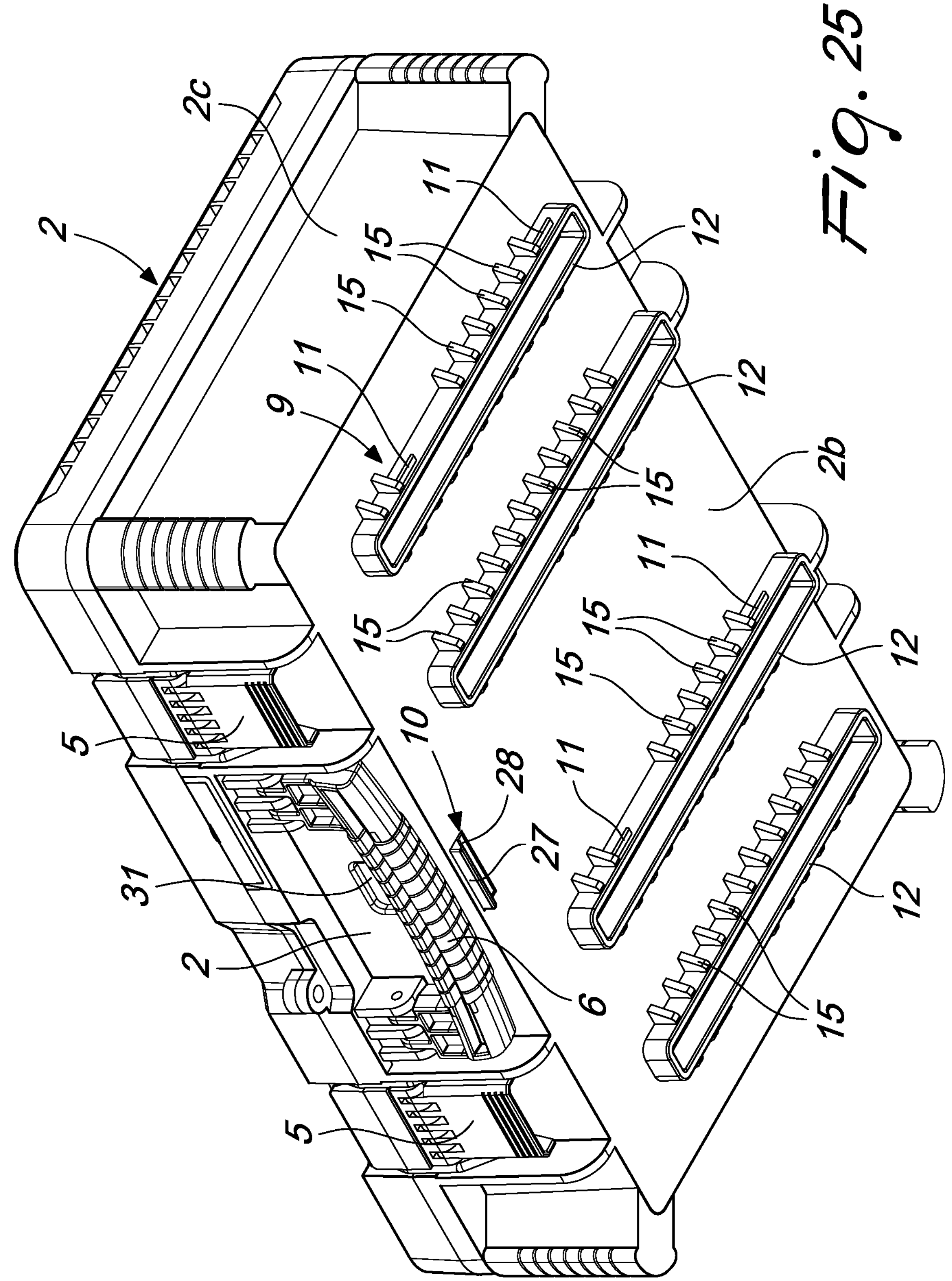
Figure 26:
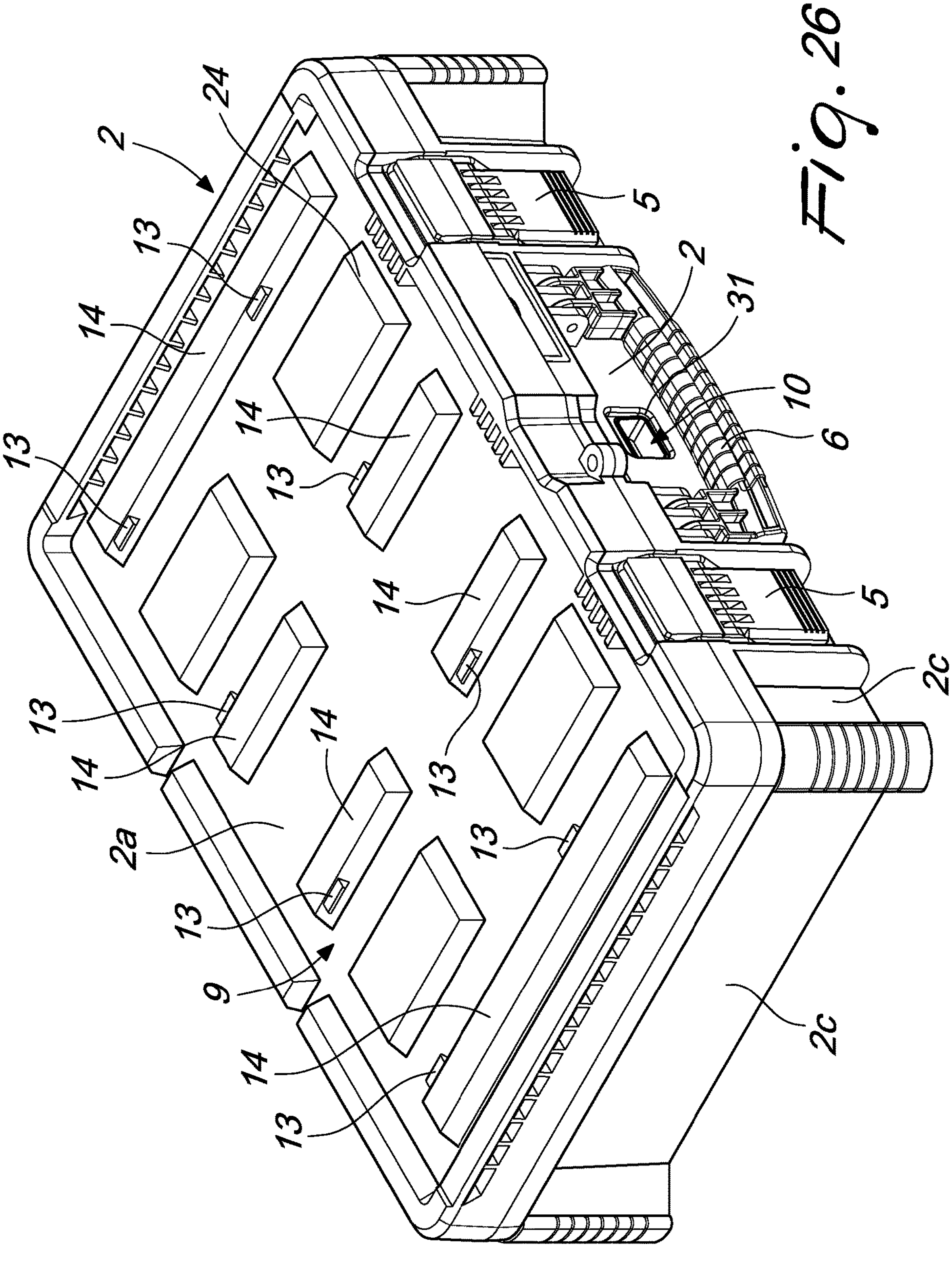
Figure 27:
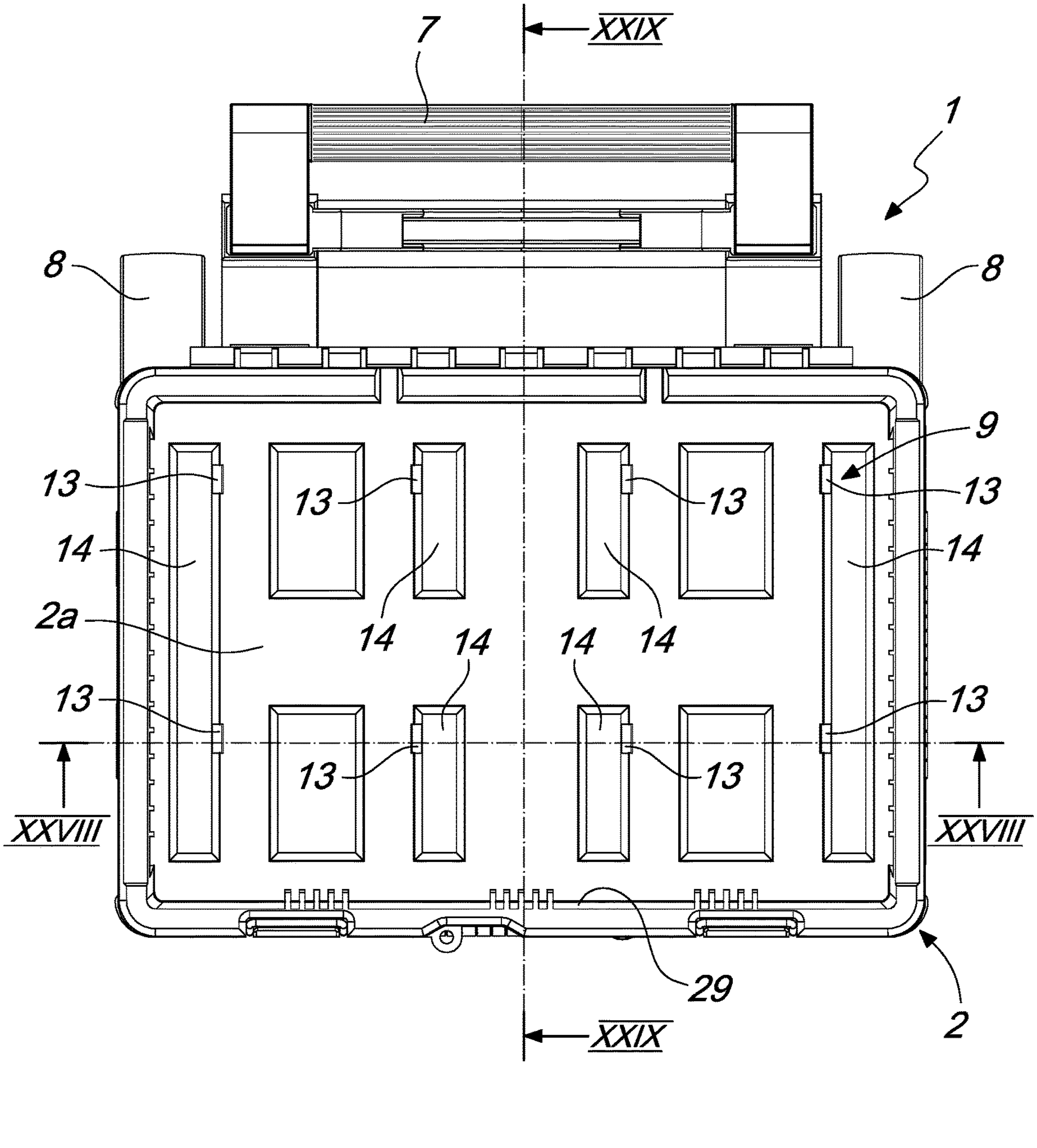
Figure 28:
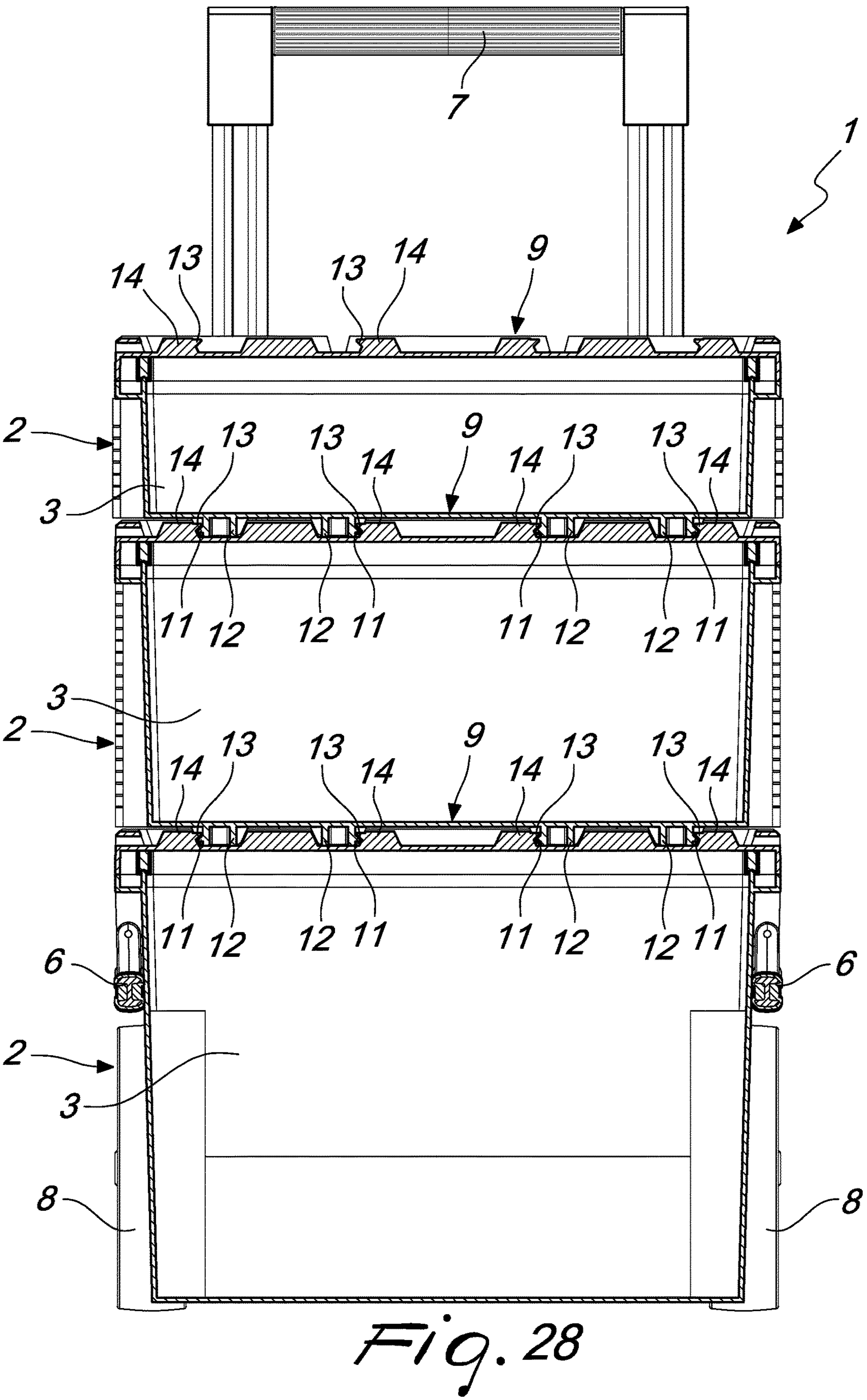

In particular, if the two (or more) containers 2 have identical transverse dimensions (identical dimensions of lids 2*a* and bottoms 2*b*), this stacking configuration corresponds to the one in which there is perfect alignment of the respective side walls 2*c* of the containers 2 (FIG. 24 for example).

Figure 1:
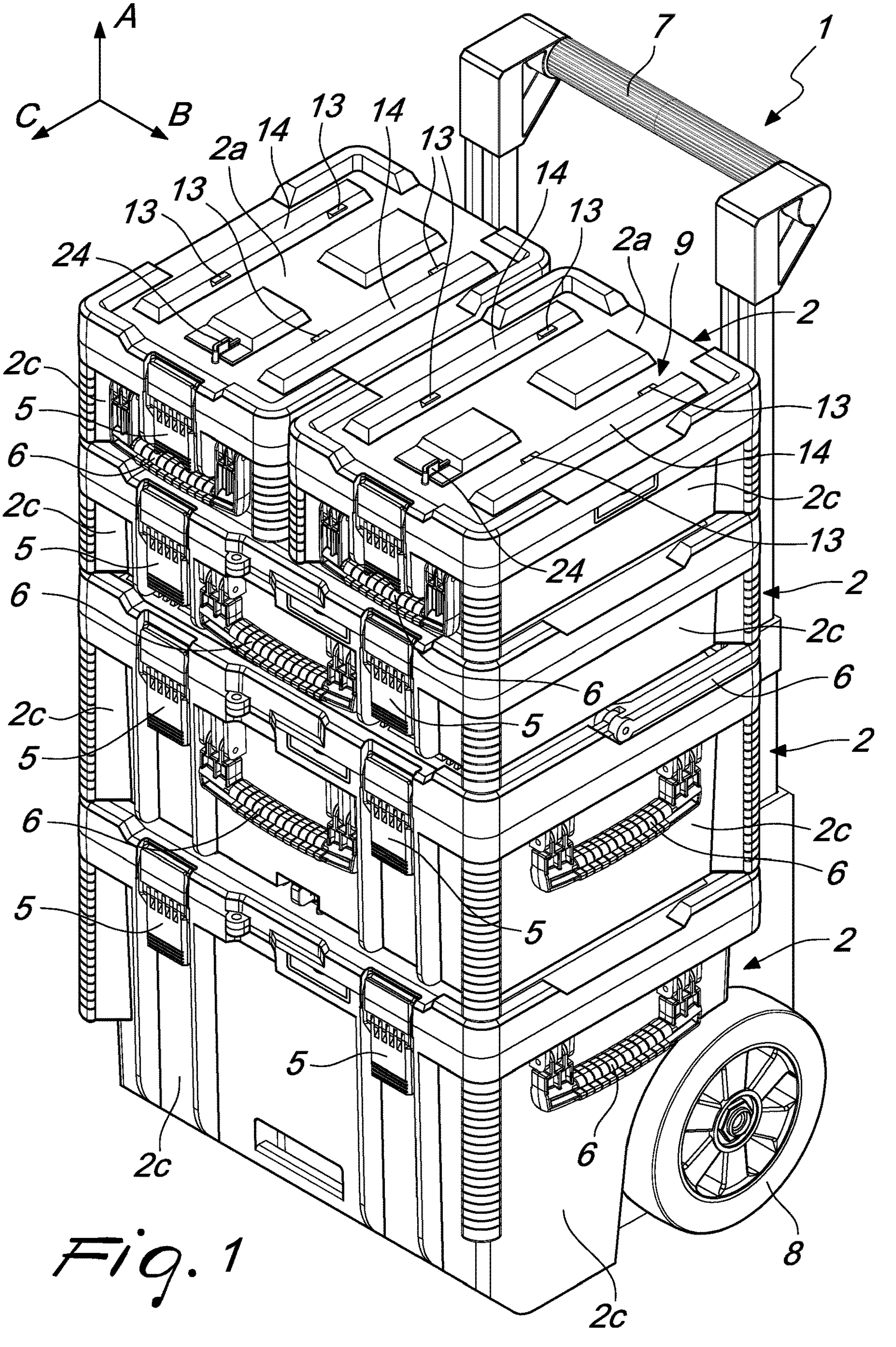
FIGS. 1 to 12 are views of the set according to the disclosure, in the first embodiment, more specifically.

If one container 2 has larger basic dimensions than the other, then the stacking configuration in fact corresponds, as previously mentioned, to the configuration of alignment of two or three respective side walls 2*c*: FIG. 1 in fact shows a solution in this sense, in which, in an upper level of the stack, there are two containers 2 with smaller dimensions than the underlying containers 2, which are arranged in the stacking configuration.

More generally, by "stacking configuration" what is meant here is a specific mutual arrangement (active, indeed) in which the bottom 2*b* of the first container 2 is rested in parallel on the lid 2*a* of the second container 2 and the relative position of the first container 2 on the second is not any position, but is the position in which it is possible to activate the means for retention (or in which they automatically activate).

As will be explained, often this activation can be obtained by first resting the first container 2 on the second in a different relative position (partially offset) and then making it slide up until the active arrangement.

In any case, the stacking configuration (precisely because it corresponds to the mutual retention condition of the containers 2) is the configuration in which the containers 2 can be easily moved, for example by pulling them over the ground by availing of the wheels 8. Moreover, precisely in envisaging transport over ground using wheels 8, it is possible for a single container 2 to be fitted with wheels, and this container 2 will also preferably be the only one provided with a telescopic handle 7, which can be extracted up until the handle is brought above the top of the first container 2, higher up in the stack.

The means for retention can be directly formed by one or both the containers 2 (and therefore effectively be in a single piece with the containers 2 and with the half-shells in particular) or they can be constituted by separate elements, coupled or capable of being coupled to one or both the containers 2.

By virtue of the means for retention it is therefore possible to achieve the set aim, in that the means make it possible to provide a stable stack of containers 2 (until the user intervenes to deactivate them), which can be effectively and easily transported (directly by the user or by storing it in the goods compartment of an airplane, a train, a ship, in the equipped compartment of a van, etc.).

In particular, in a possible embodiment of the disclosure, the means comprise at least one mutual coupling system 9 and a selective locking element 10. In more detail, the system 9 is automatically activated in the stacking configuration and is configured to obstruct the mutual spacing apart of the containers 2 along a first axis A, at right angles to the bottoms 2*b* and to the lids 2*a* (in the stacking configuration), and a second axis B, at right angles to the first axis A.

In other words, it is sufficient to place the first container 2 on the second container 2 in the stacking configuration (in the active arrangement), in order to automatically obtain the mutual coupling and obstruct the relative translation in the direction identified by the first axis A and/or in the direction identified by the second axis B (by coupling what is meant is in fact obstructing the relative translation along the first axis A and/or the second axis B).

It should be noted that each container 2 is ideally designed to rest with its bottom 2*b* on the ground, which defines therefore a form of ideal resting surface and a specific orientation of each container 2 and of the set 1 of stacked containers 2. The first axis A can therefore be defined, in an equivalent manner, as the axis at right angles to the ideal resting surface (effectively common to the individual container 2 and to the stack) or also as a vertical axis, while the second axis B, at right angle to the first axis A, is in an equivalent manner a first axis parallel to the resting surface (or first horizontal axis).

The element 10 is automatically activated in the stacking configuration (as soon as the containers 2 are placed in the active arrangement) and is configured to obstruct the mutual spacing apart of the containers 2 along a third axis C (at least in one of the two directions of translation), at right angles to the first axis A and to the second axis B (in the stacking configuration). This element 10 can be selectively deactivated (by a user) in order to allow the mutual spacing apart of the containers 2 along the third axis C (at least in one of the two directions of translation).

By following the equivalence given above, the third axis C can be considered a second axis parallel to the resting surface (or second horizontal axis).

Furthermore, typically the second axis B and the third axis C are the ones that identify the two main dimensions of the bottom 2*b* and of the lid 2*a* (width and length/depth of the container 2), while the first axis A corresponds to the height of the container 2.

The axes A, B and C identify a form of Cartesian reference and are shown only in some figures, for the sake of simplicity.

The system 9 and the element 10 therefore cooperate between them to immobilize the containers 2, in the stacking configuration; at the same time, the element 10 can be deactivated to allow the decoupling (which will take place, at least for an initial first stroke, by moving one of the containers 2 with respect to the other along the third axis C).

The different embodiments shown in FIGS. 1-44 show different possible practical methods of implementing the system 9 and/or the element 10.

In particular, in a first possible embodiment, the system 9 comprises first ledges 11 which protrude transversely from respective first protrusions 12 which extend from the bottom 2*b* of the first container 2 and second ledges 13 which protrude transversely from respective second protrusions 14 which extend from the lid 2*a* of the second container 2.

Figure 9:
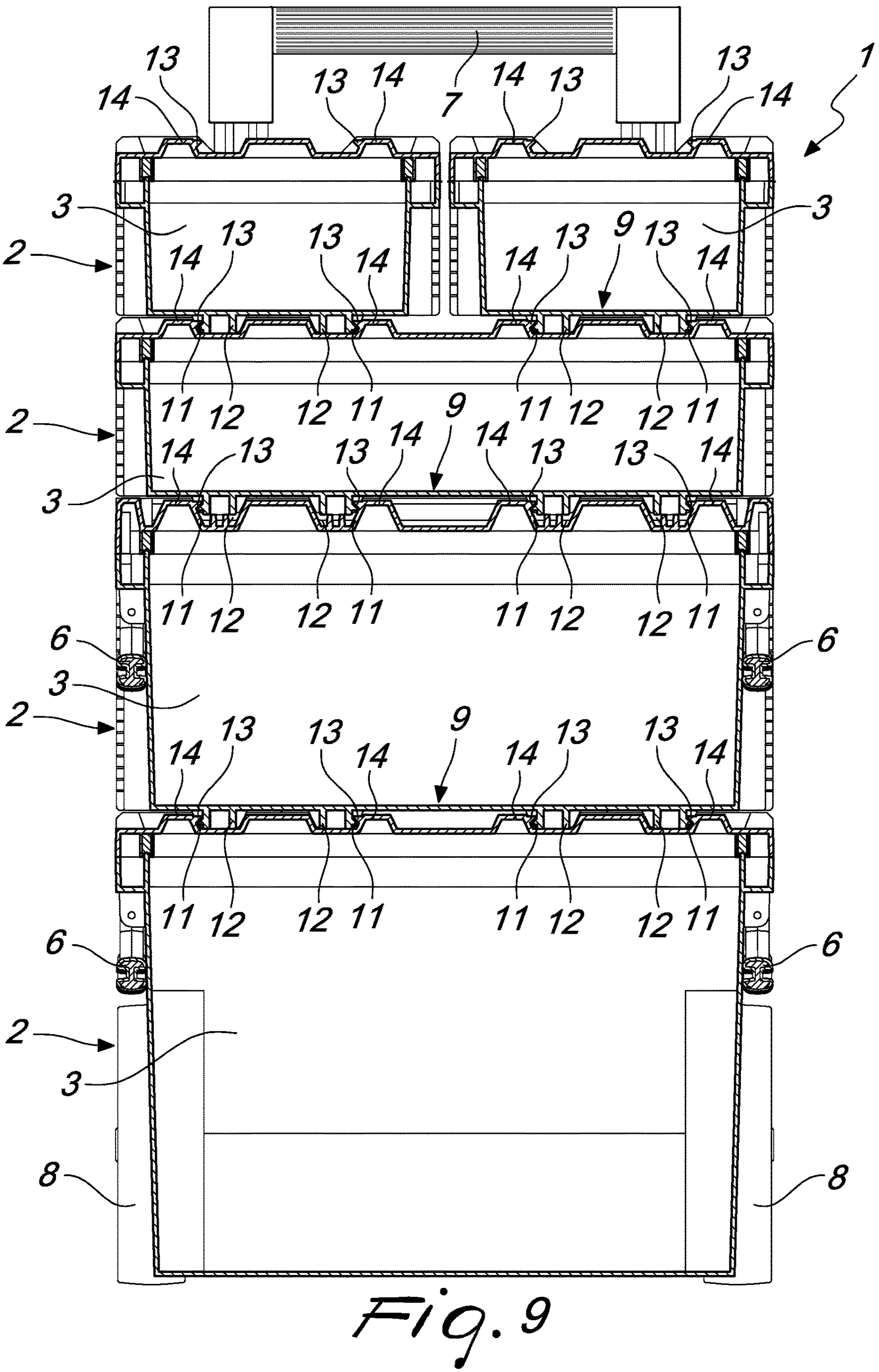
Figure 10:
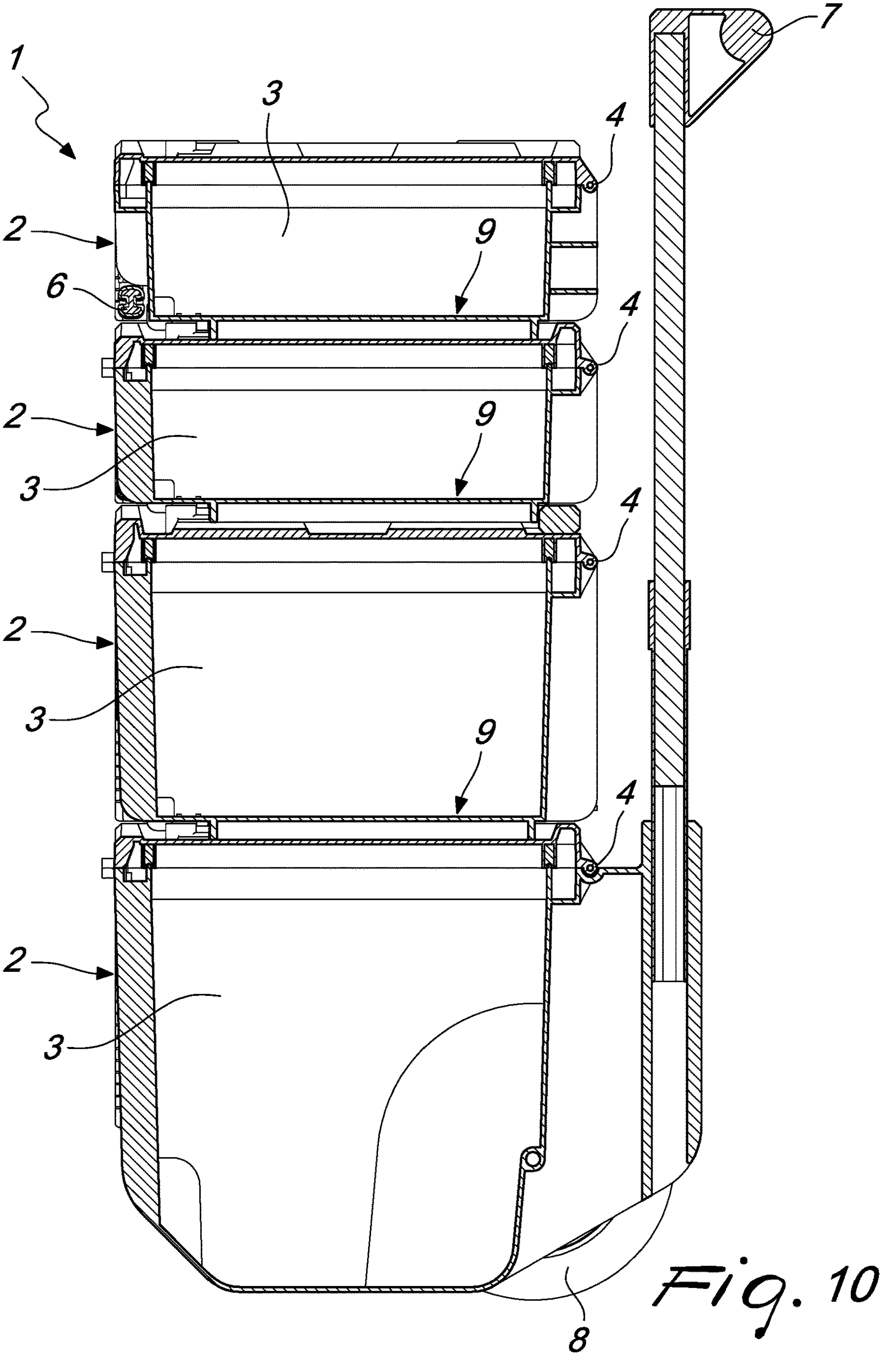
Figure 11:
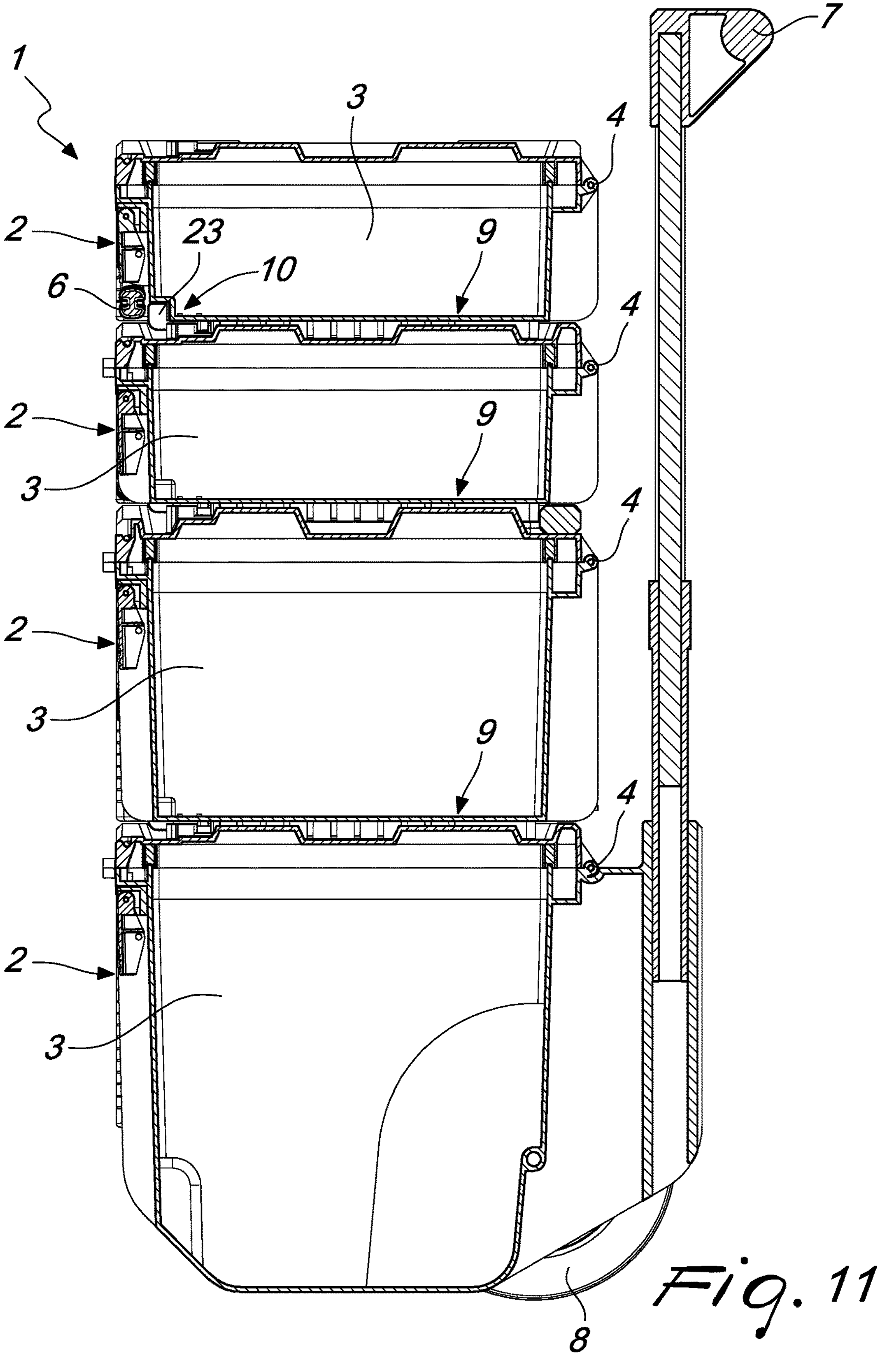
Figure 12:
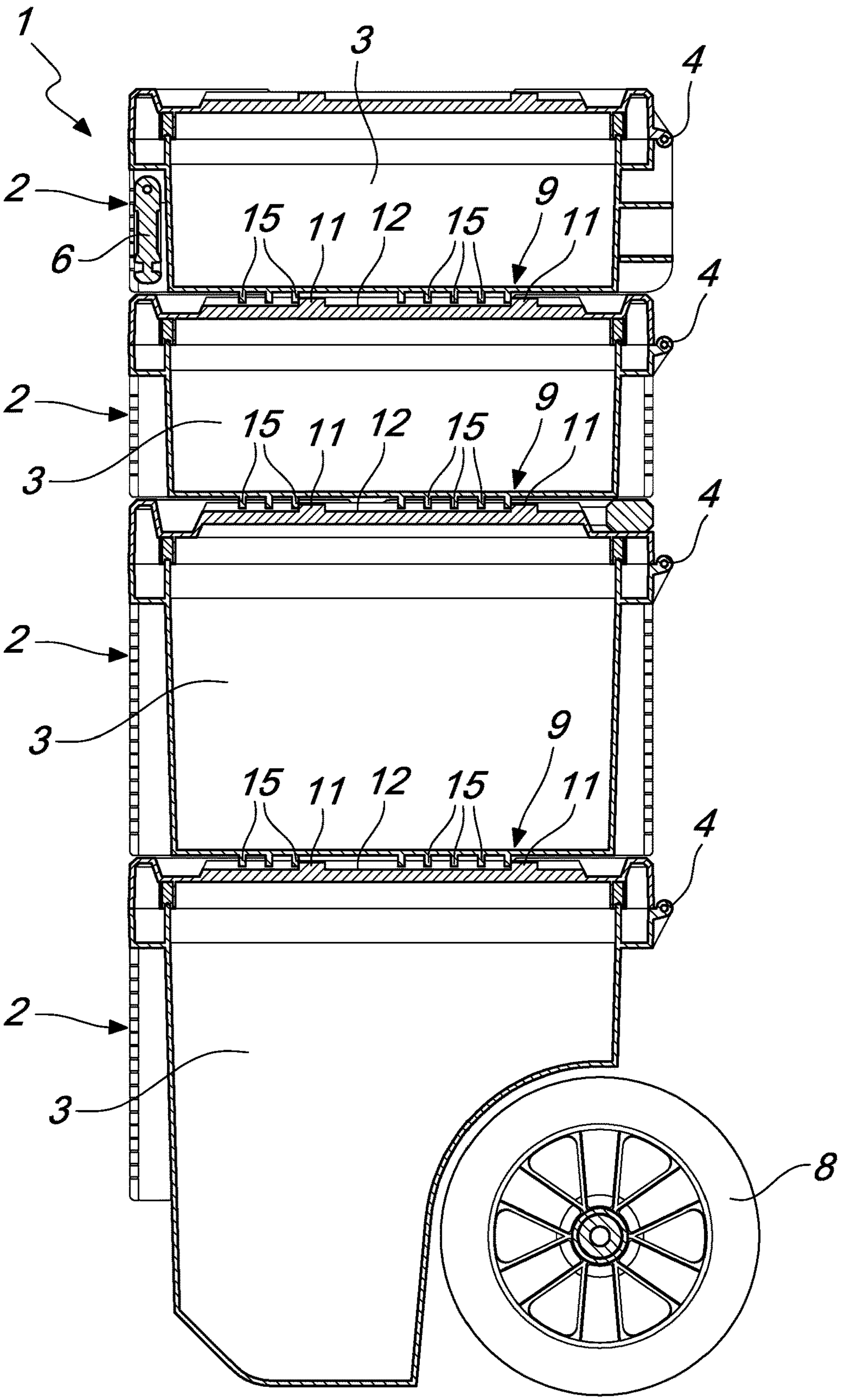

The first protrusions 12 are arranged side-by-side with the second protrusions 14 in the stacking configuration (by virtue of a suitable construction of the containers 2): this allows the at least partial insertion of the first ledges 11 between the second ledges 13 and the lid 2*a* of the second container 2, with consequent mutual coupling of the containers 2 (see for example FIG. 9).

In practice, therefore, the mutual coupling is obtained by first of all positioning the first container 2 on the second in an arrangement other than the active arrangement 8 (for example as in FIG. 13), in order to then make the first slide on the second so that the first ledges 11 of the first container 2 slip under the second ledges 13 (between the second ledges and the lid 2*a* of the second container 2). The superimposition of the ledges 11, 13 prevents the movement along the first axis A while the mutual flanking of the protrusions 12, 14, conveniently dimensioned and distributed, obstructs the relative translation along the second axis B.

The embodiments of FIGS. 1-36 show different possible practical embodiments of the concepts just explained in the previous paragraph.

More specifically, and with further reference to FIGS. 1-36, the first protrusions 12 and the second protrusions 14 are distributed offset and parallel to the third axis C (and optionally some of them can be without respective ledges 11, 13, or have them on one or both flanks). In this manner, they make it possible to slide the first container 2 on the second container 2 solely parallel to this third axis C (the sequence of sliding in this direction is well shown in FIGS. 15-22). The user therefore can initially place the first container 2 on the second container 2 in an arrangement other than the active arrangement, while taking care in any case to arrange the first protrusions 12 in the spaces between adjacent second protrusions 14, in order to then make the first container 2 slide on the second along the third axis C, until the superimposition of the ledges 11, 13.

Preferably, the protrusions 12, 14 have an elongated rectangular shape (parallel to the third axis C) and, even more preferably, at least the second protrusions 14 have, along the flanks, stiffening ribs 15, some of which, conveniently positioned, can also represent stroke limits for the sliding of the first container 2 on the second, since the first ledges 11 abut against them when they reach the active arrangement. The stroke limits can likewise cooperate with the element 10 to obstruct the translation along the third axis C (in the opposite direction to that obstructed by the element 10).

FIGS. 37-44 show a second possible embodiment for the system 9 (which does not exhaust the solutions comprised in the scope of protection claimed herein). In this case in fact, it comprises at least, first of all, one peg 16, which is stably coupled to either the bottom 2*b* of the first container 2 or the lid 2*a* of the second container 2. Furthermore, the system 9 comprises at least one internally hollow bell 17, which is coupled with its base to the other of either the bottom 2*b* of the first container 2 or the lid 2*a* of the second container 2 and is open on the opposite side. In this manner, the bell 17 can receive the peg 16 in the stacking configuration (it is sufficient for the user to move the first container 2 toward the second, keeping the respective bottoms 2*b* mutually parallel and indeed aligning the peg 16 with the bell 17).

The bell 17 is furthermore open on one flank, at a slot 18 arranged along the third axis C (in the stacking configuration).

It should be noted that the peg 16 and/or the bell 17 can be provided in a single piece with the respective containers 2, therefore being directly formed by the corresponding half-shells or in any case by the bottom 2*b* and/or by the lid 2*a*. Likewise, the peg 16 and/or the bell 17 can be separate objects, which are subsequently fixed to the containers 2. In the mentioned figures, several possibilities in this sense are shown: for example in fact, the peg 16 can be passed through by a female thread 16*a* as in FIGS. 37-42, in order to allow the screwing of a screw which is designed to couple it to the lid 2*a* or to the bottom 2*b* of a container 2. Alternatively, the peg 16 can have a flattened head 16*b* (FIGS. 43-44) which can be stably applied (by welding, adhesive bonding, etc.) to the lid 2*a* or to the bottom 2*b* of a container 2; the head 16*b* can also be part of the lid 2*a* or of the bottom 2*b*.

The base of the bell 17 can in turn be anchored by welding to a plate 19 at grub screws 20 (which become fused with the welding) located at the peripheral region of the base (FIGS. 37-42): the plate 19 can then be applied to the container 2 or directly constitute a part of the bottom 2*b* or of the lid 2*a*.

It is emphasized in any case that the various options described above constitute only some embodiments, which should not be understood to be exhaustive or limiting of the application of the disclosure.

Figure 41:
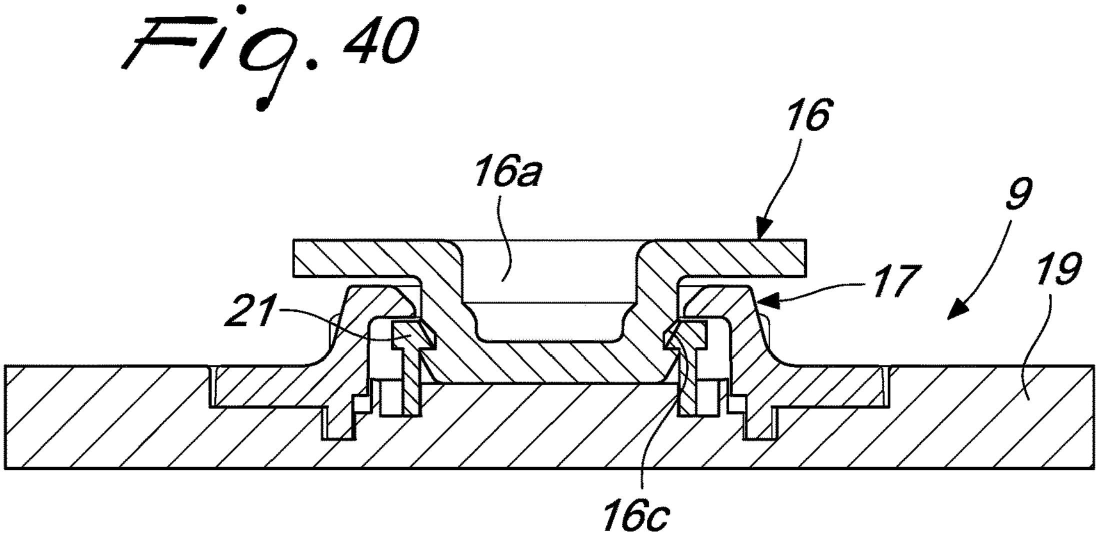
Figure 42:
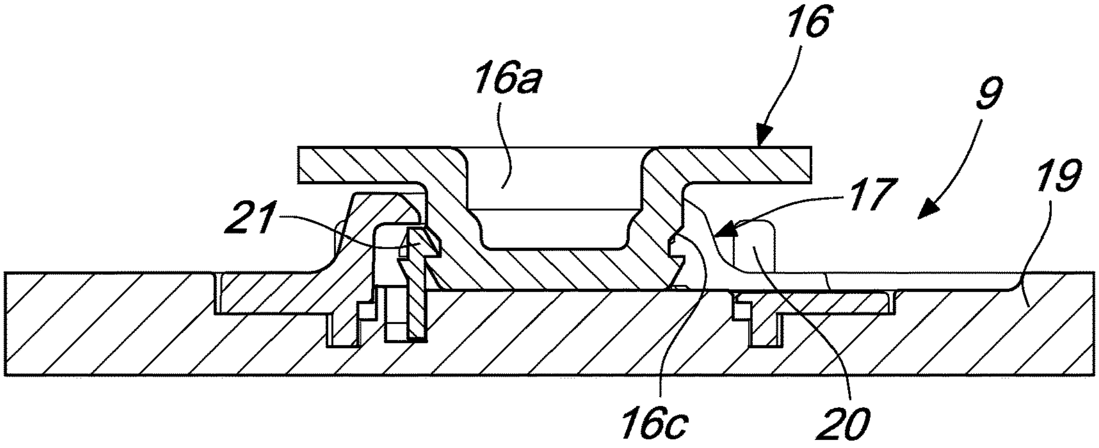
Figure 43:
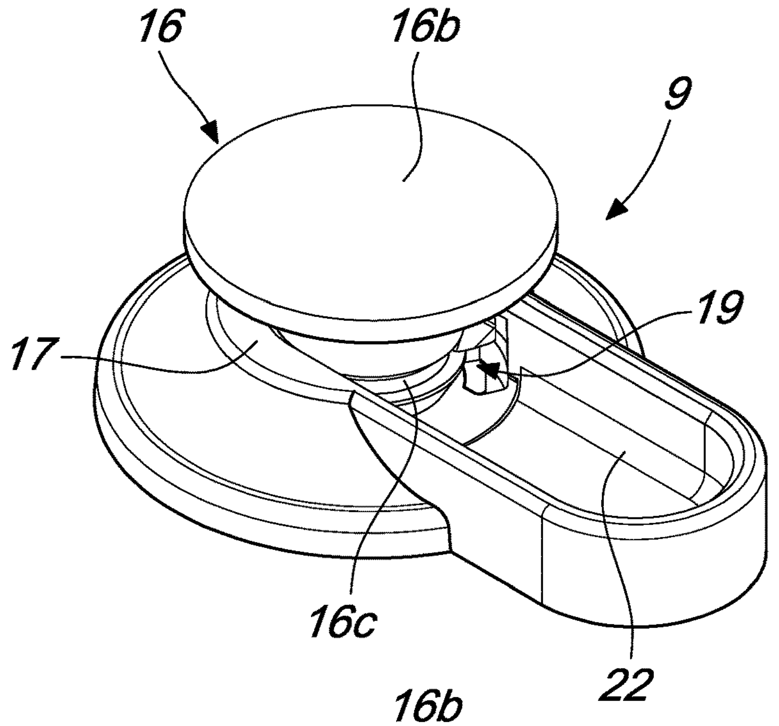

Furthermore, in this embodiment the system 9 also comprises an elastically deformable ring 21, which is coaxially captive, with play, in the bell 17 and can be accommodated in a transverse track 16*c* provided along the peg 16 in the stacking configuration (FIGS. 41-42).

The ring 21, owing to the dimensions conferred on the ring 21 and on the bell 17, cannot exit from the latter, but internally it is free to widen and narrow by elastic deformation (the play available to the ring 21 is clearly visible in FIGS. 41 and 42). The ring 21 is furthermore oriented so that its point of discontinuity is facing the slot 18.

In the non-deformed configuration, its radius is smaller than the corresponding transverse dimension of the peg 16: thus, following the insertion of the latter into the bell 17, the ring 21 widens elastically in order to embrace the peg 16, subsequently ending up being seated in the track 16*c* and returning to the non-deformed configuration (or in any case for clamping the peg 16) in the stacking configuration.

Such operation is moreover facilitated by the conveniently inclined surfaces of the parts involved of the ring 21 and of the peg 16.

After its placement around the peg 16 (in the track 16*c*), the ring 21 evidently increases the transverse dimension of the peg 16 and therefore, in the stacking configuration, prevents the extraction of the latter from the bell 17, along the first axis A, while the bell 17 opposes the relative movement of the peg 16 (and of the corresponding container 2) along the second axis B, but not with respect to the third axis C, owing to the slot 18, which in fact allows the disengagement (which is obstructed by the locking element 10). In more detail, the bell 17 plus the slot 18 allow the movement of the peg 16 (and of the container 2) in one of the two directions of translation along the third axis C, while preventing the relative sliding in the other direction.

In particular, the system 9 can comprise a closed trackway 22 (FIGS. 43-44) which extends from the slot 18 along the third axis C and which defines a guide rail and a form of stroke limit for the sliding of the peg 16.

Figure 44:
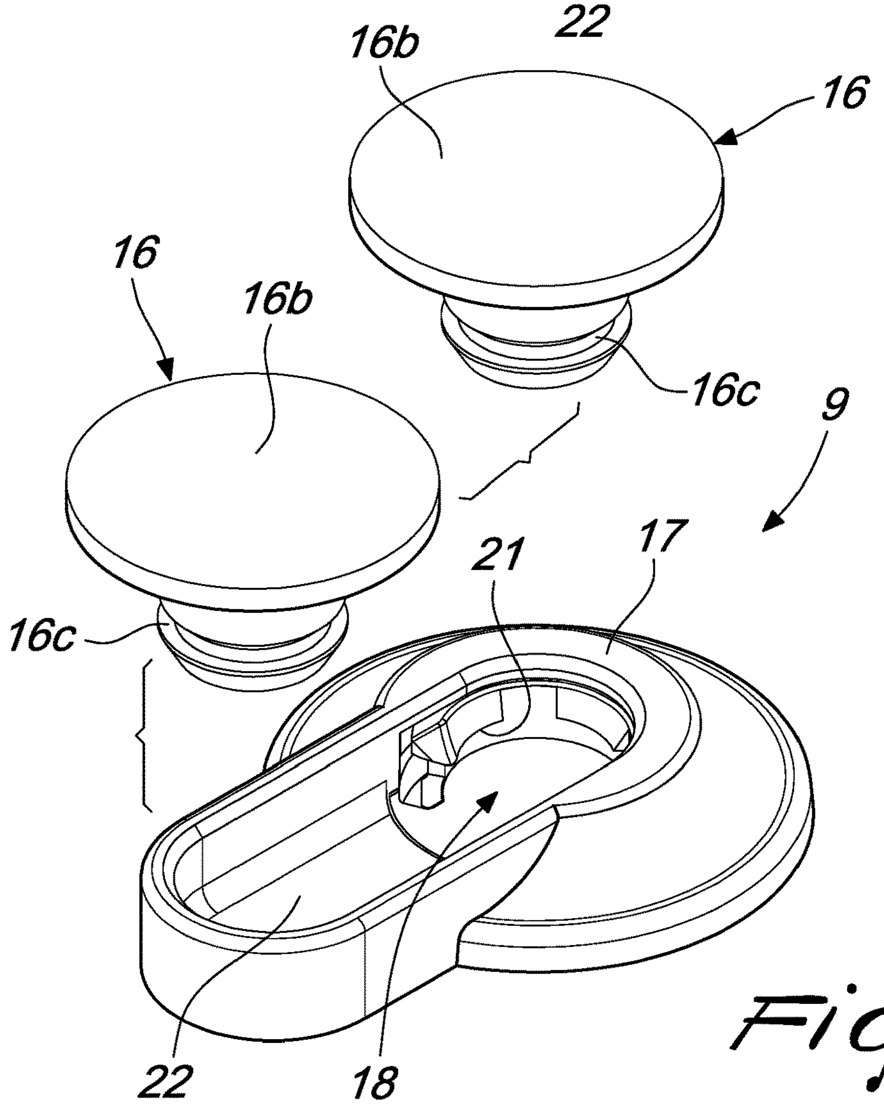
Figure 45:
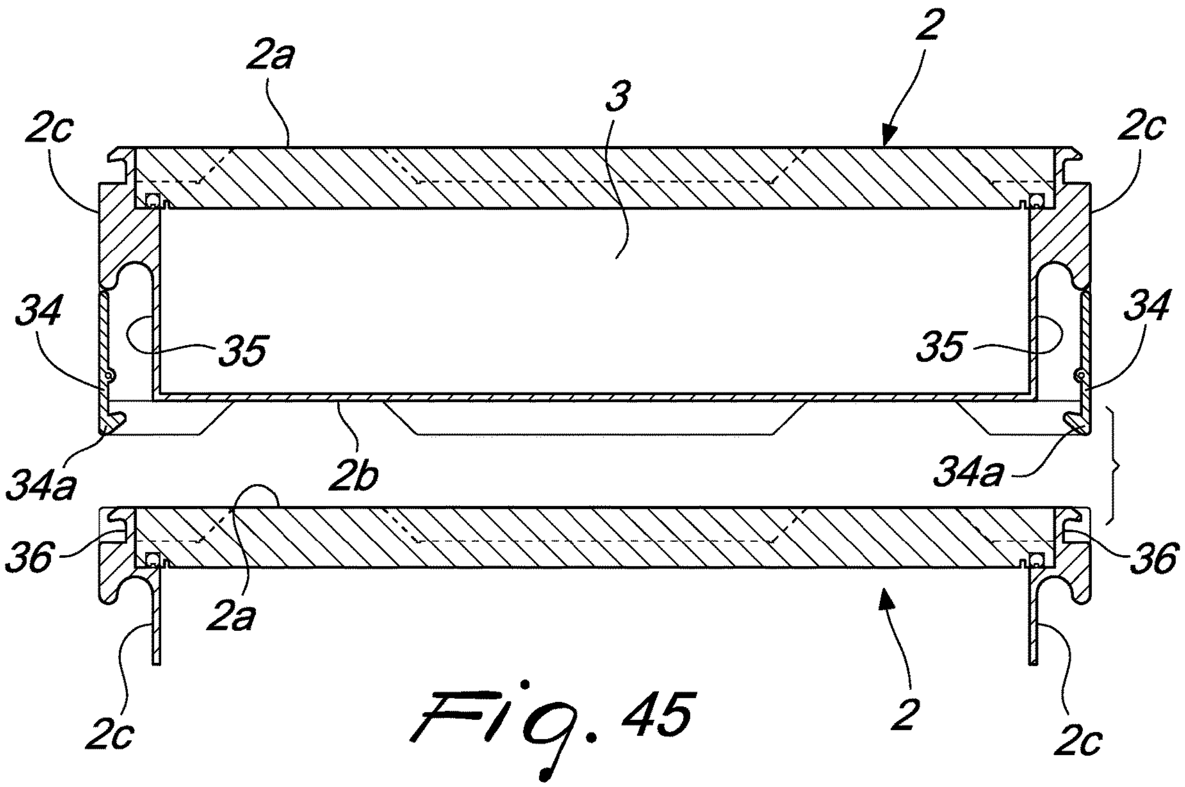

When the user makes the first container 2 slide on the second (after having deactivated the element 10), bringing the peg 16 to protrude from the bell 17 at the slot 18, this peg 16 moves inside the trackway 22 (defined effectively by the bell 17 or in any case integrally with it), until it stops at the other end, on the stroke limit. In this sense, the trackway 22 and its stroke limit in particular are found to be useful when it is considered that, when the user wants to disengage the containers 2, he or she cannot see the peg 16 and the bell 17, and so is informed that he or she has moved the peg 16 sufficiently (so as to extract it completely from the bell 17), when the latter stops against the stroke limit defined by the trackway 22. FIG. 44 in fact shows a peg 16 above the bell 17 (in the arrangement that allows the insertion of the former into the latter in order to arrive at the stacking configuration, shown in FIG. 43) and a second peg 16 shifted laterally, in the arrangement that is obtained when, after having disengaged the containers 2 by sliding the peg 16 in the trackway 22, this peg and the first container 2 are lifted.

Figure 38:
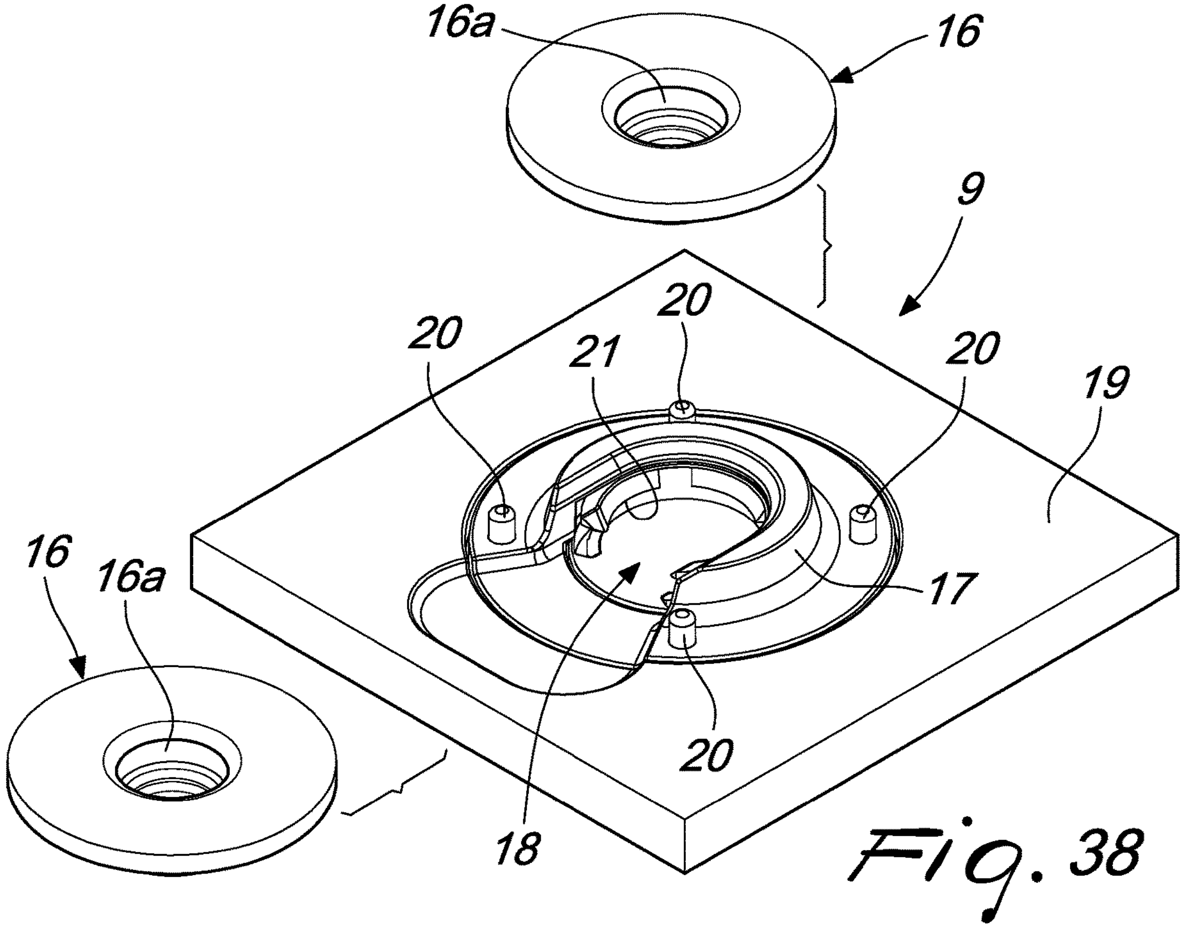
Figure 39:
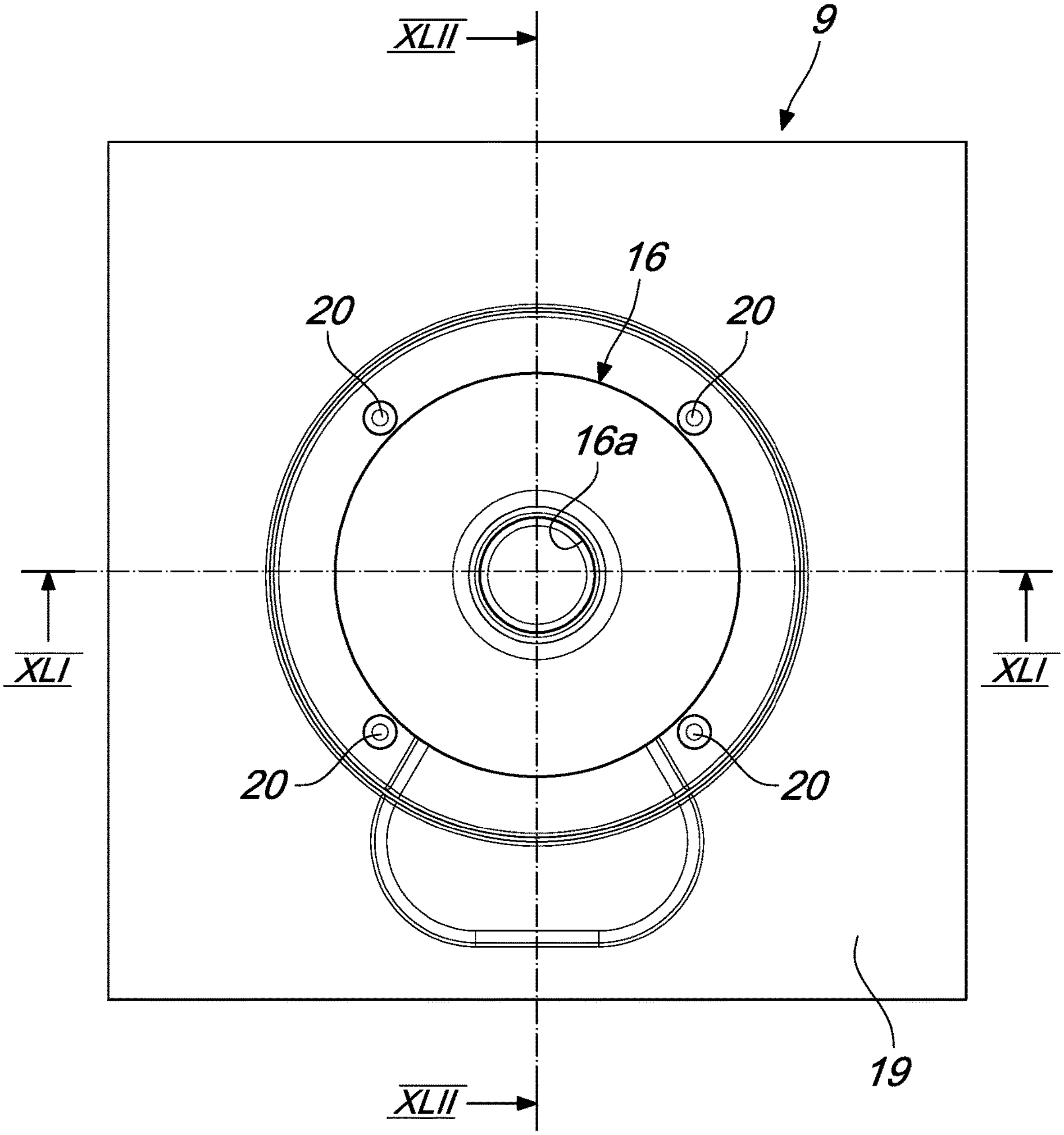
Figure 40:
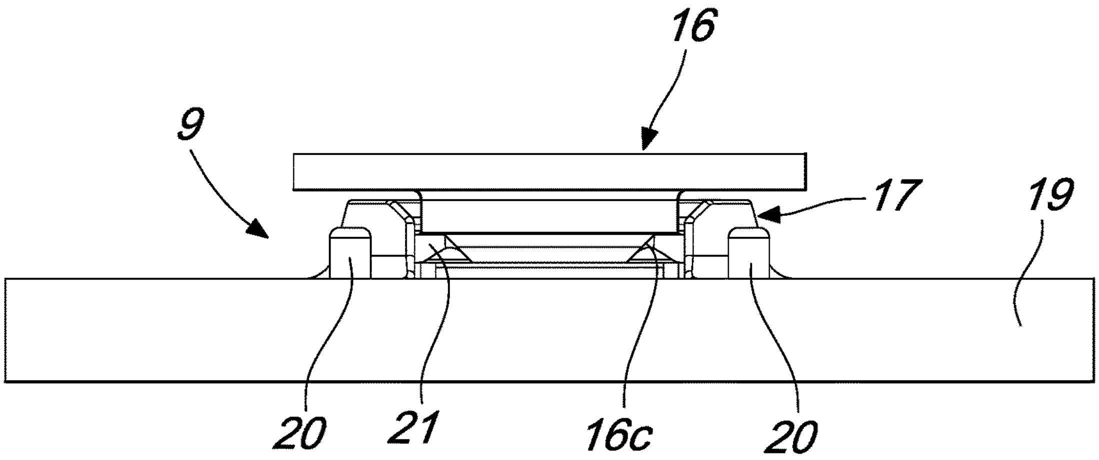

FIG. 38 also shows, in a different embodiment, a peg 16 above the bell 17 and ready for insertion and a peg 16 in the position reached after disengagement.

As noted for the system 9, the element 10 can also be provided in different practical embodiments, some of which will be described in detail below. The set 1 and in particular each container 2 can be provided with means for retention that comprise a system 9 according to any one of the options described above (or others) and an element 10 also chosen freely (if functionally compatible) from the ones described below (or others).

In particular, in a first implementation solution (adopted in the two embodiments of FIGS. 1-12 and 13-21), the element 10 comprises (or is constituted by) a hook 23, articulated to either the bottom 2*b* of the first container 2 (preferably) or the lid 2*a* of the second container 2 about a rotation axis at right angles to the bottom 2*b* and to the lid 2*a* of the respective container 2 (the one to which it is articulated). The hook 23 therefore moves on an ideal plane parallel to the bottom 2*b* and to the lid 2*a*.

In the stacking configuration the hook 23 is elastically kept engaged with a respective projection 24 which extends from the other of either the bottom 2*b* of the first container 2 or the lid 2*a* of the second container 2, so as to obstruct the mutual spacing apart of the containers 2 along the third axis C in at least one direction of mutual spacing apart.

The elastic reaction can be maintained by a first spring, chosen to be of any type (including conventional), not shown for simplicity in the figures. In the non-deformed configuration, the hook 23 is kept aligned with the third axis C.

Figure 16:
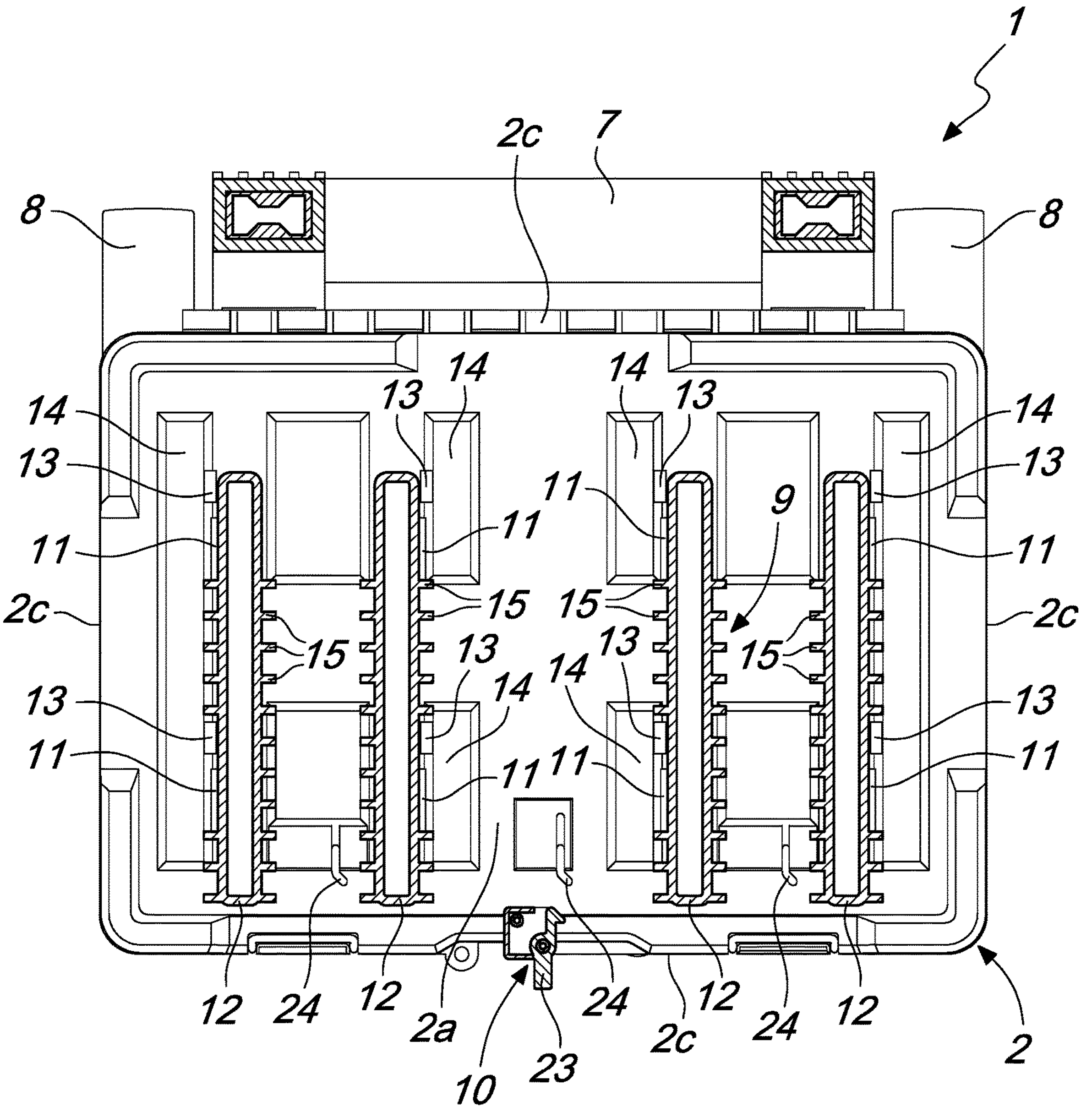

In more detail, FIGS. 13-23 clearly show the operation of the hook 23: when the first container 2 is placed on the second container 2, in the preliminary arrangement (different from the active arrangement) in which the containers 2 are partially offset (FIG. 15), the hook 23 (arranged proximate to a corner edge) is spaced apart from the projection 24 and does not interact in any way with it (FIG. 16). The detail of FIG. 14 also clearly shows the position of the hook 23 in this condition (the hook 23 protrudes into empty space, in front of the underlying second container 2).

Figure 17:
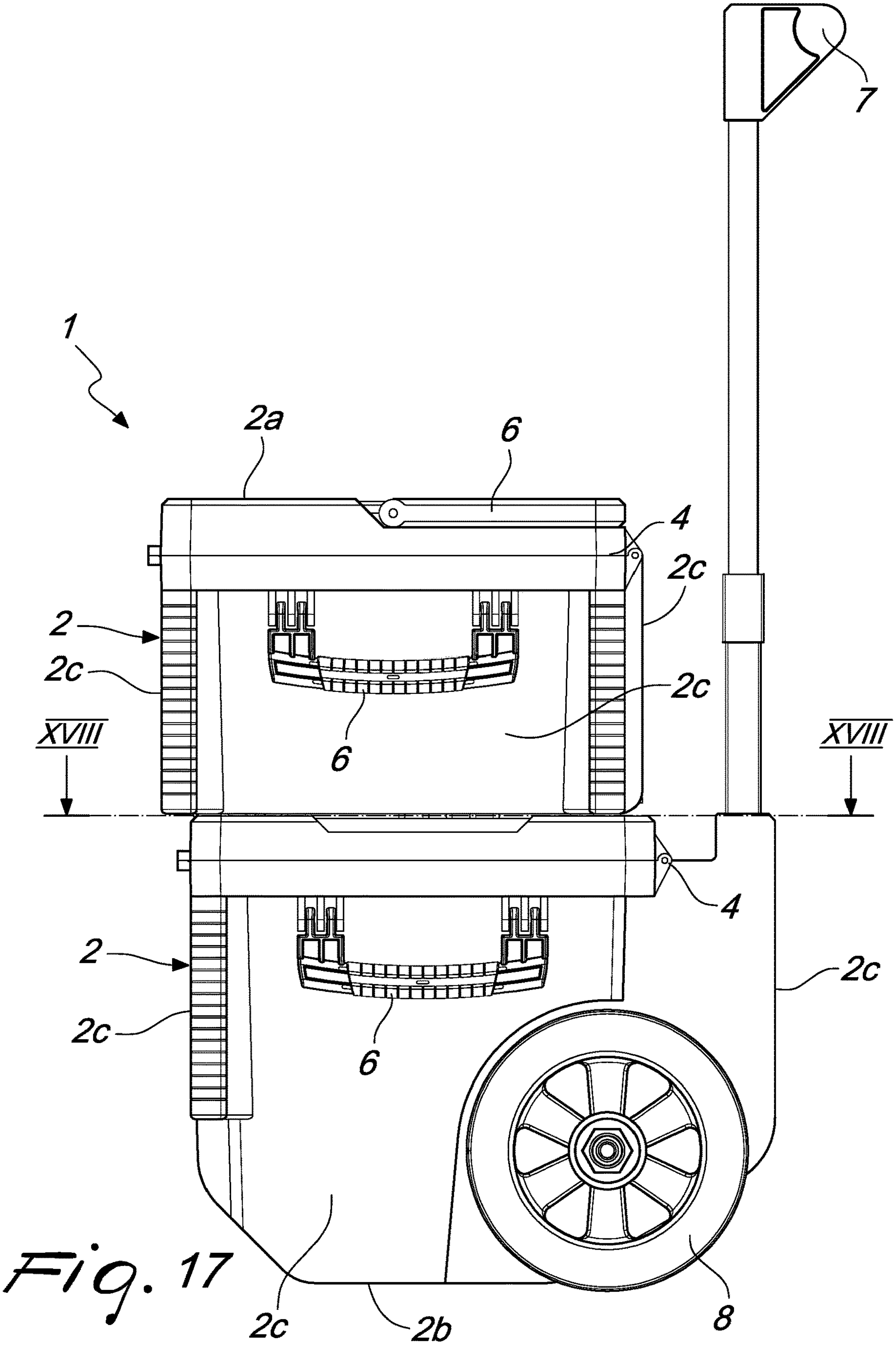
Figure 18:
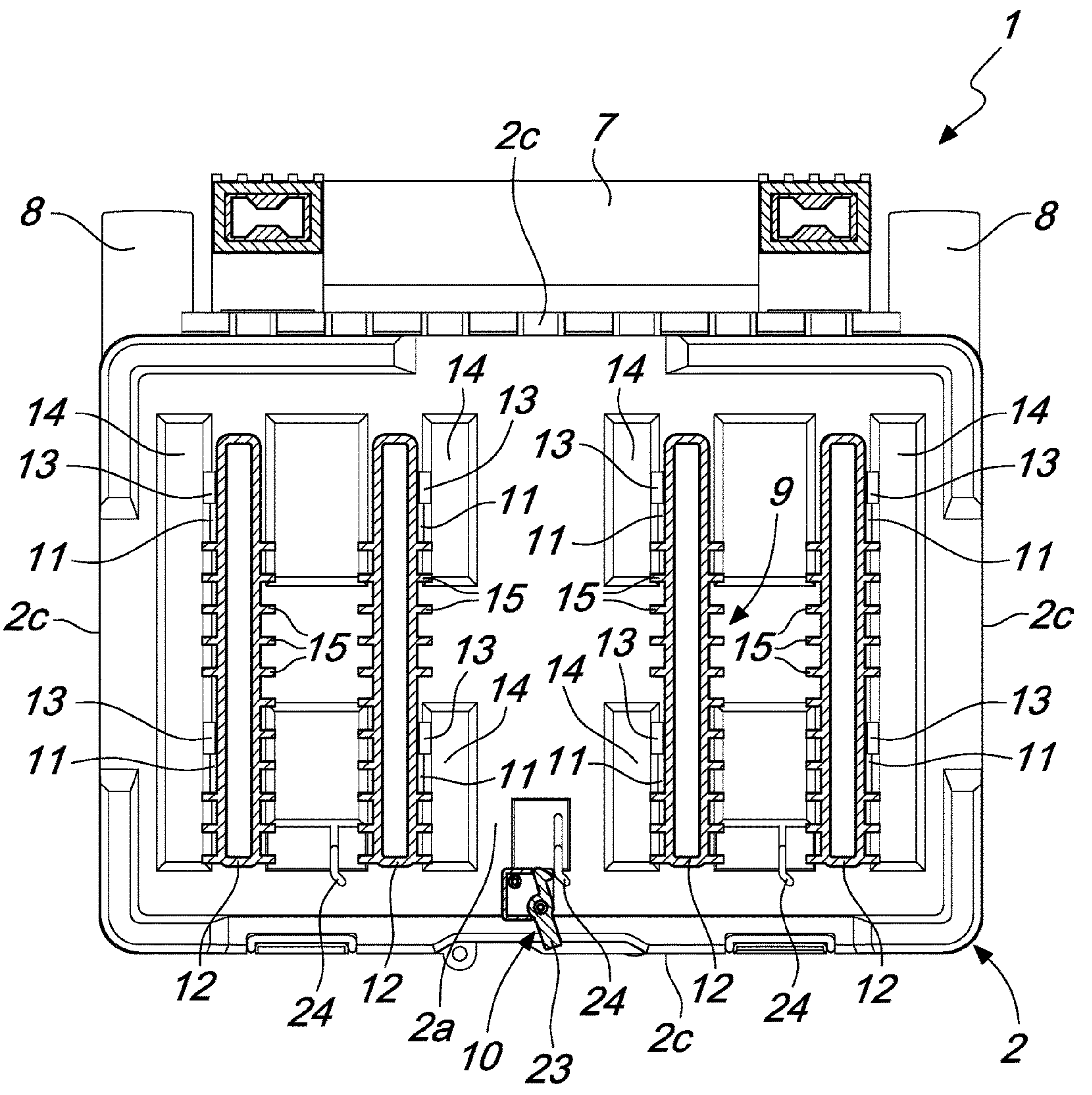
Figure 19:
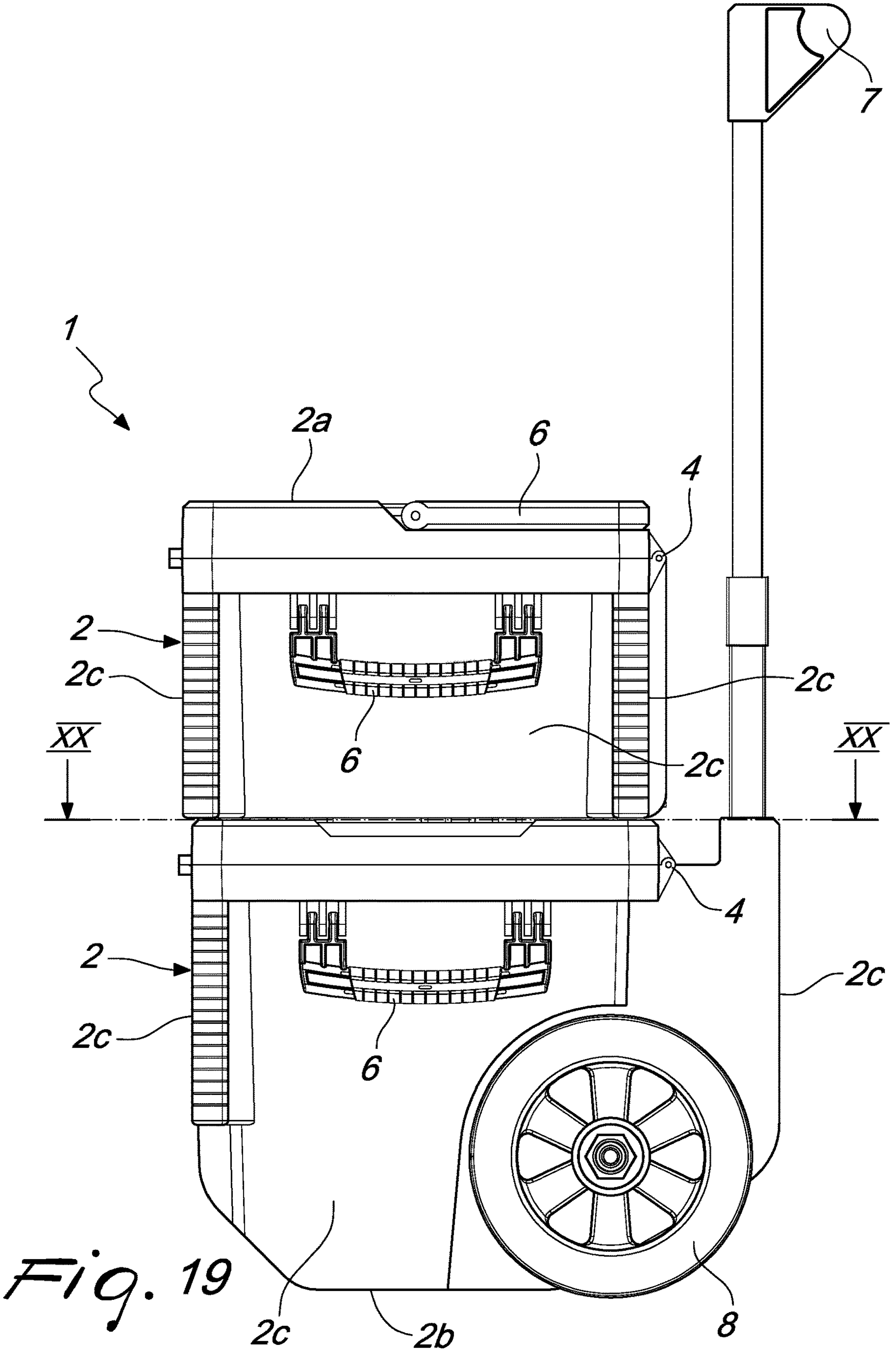
Figure 20:
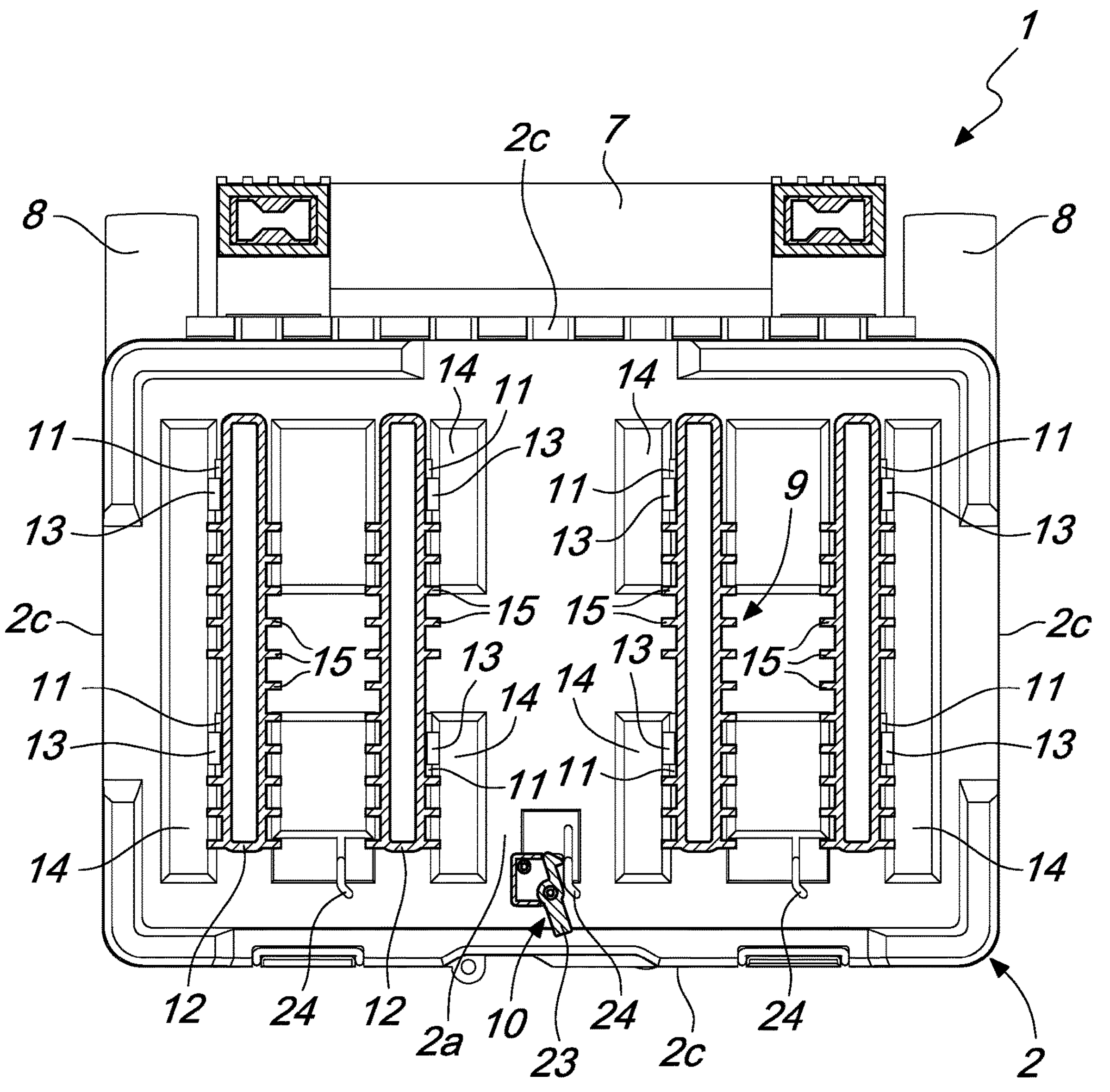
Figure 21:
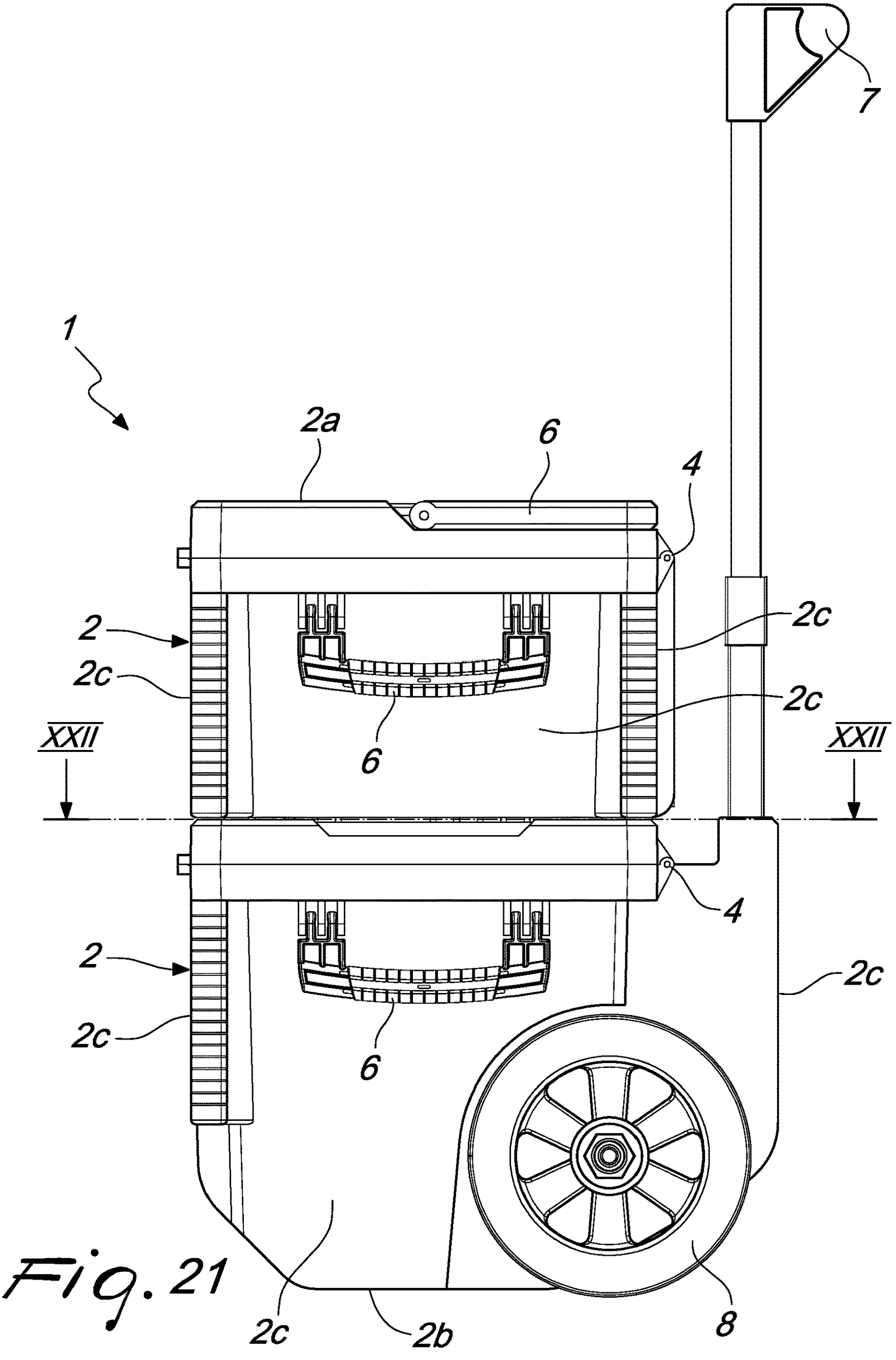
Figure 22:
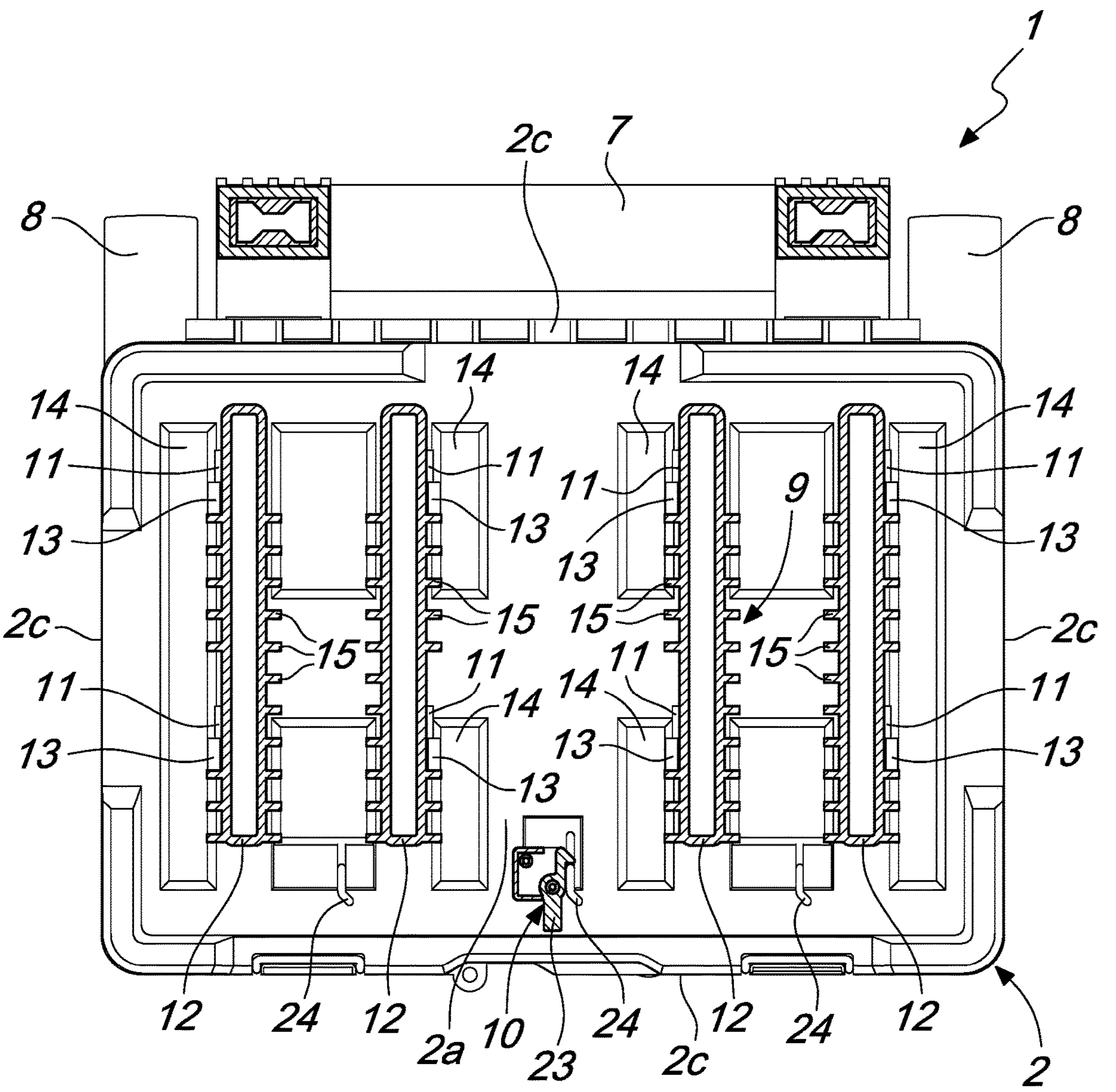
Figure 23:
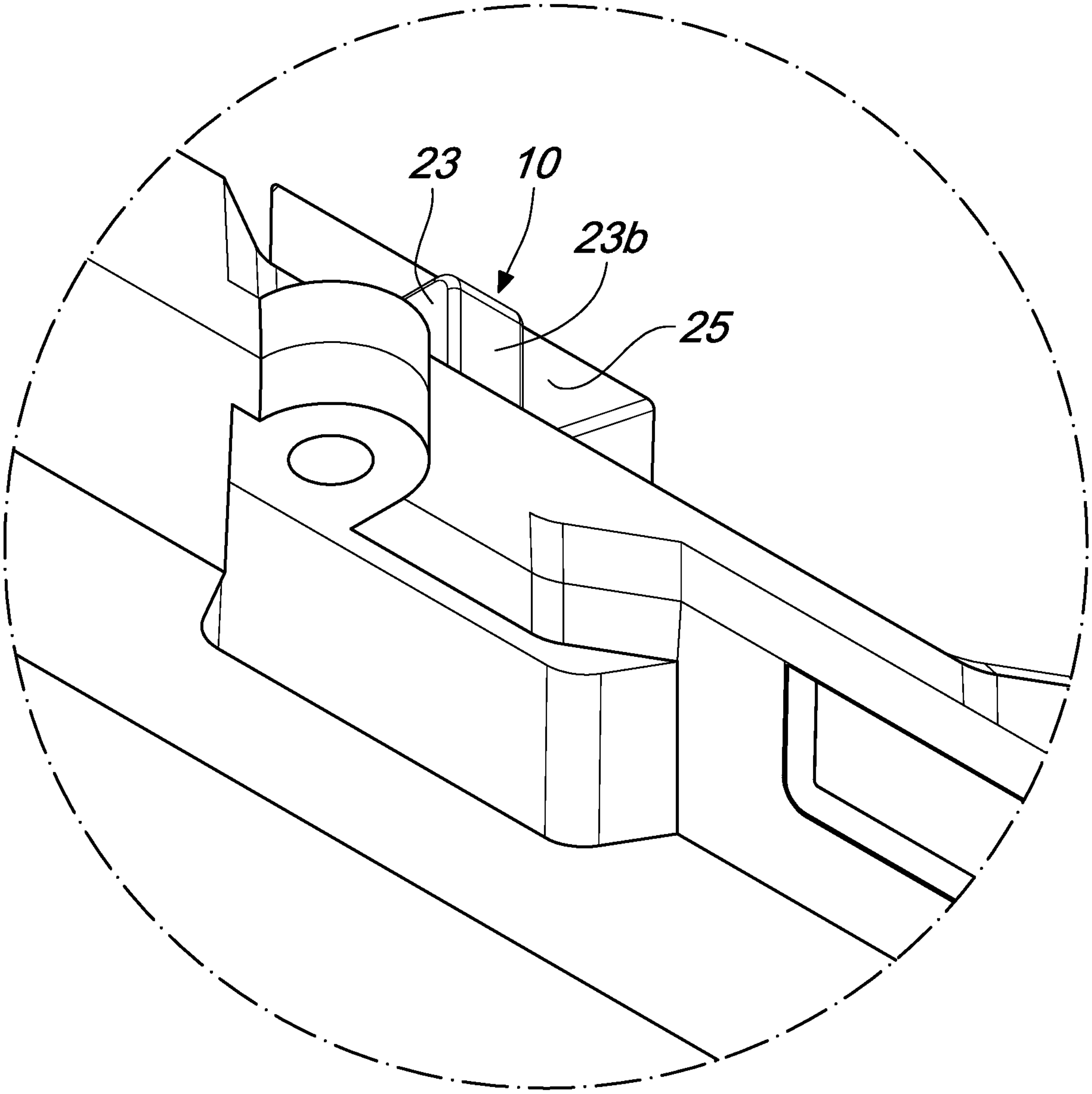

In order to arrive at the stacking configuration, the user progressively makes the first container 2 slide on the second (along the third axis C), as shown in FIGS. 17 and 19: in this manner, the hook 23 approaches the projection 24 until it collides therewith, in so doing being forced to rotate (FIG. 18). Then the hook 23 performs a further translational motion, resting on the projection 24 and sliding over a flank of the latter (FIG. 20).

When the stacking configuration is reached (FIG. 21), the hook 23 has at least partially passed the projection 24 and hence it returns to the non-deformed configuration (FIG. 22), in which in fact it engages with the projection 24 in order to oppose the subsequent spacing apart of the containers 2 (in the direction opposite to the direction followed up to now).

It is emphasized that a container 2 can be provided with a single projection 24, preferably in a central and peripheral position, or with a plurality of projections 24, so as to be able to also accept containers 2 of different dimensions on top of it (FIG. 1).

In particular, and with further reference to what is shown for the purposes of example in FIGS. 1-23, the hook 23 has a central portion articulated to the respective container 2, which is interposed between a first end portion 23*a*, barb-shaped and in fact configured to engage with the projection 24, and a second end portion 23*b*, facing outward at a recess 25 provided along a corner edge of the container 2. By virtue of this peculiar choice, the second end portion 23*b* is easily accessible (when the containers 2 are stacked) and this allows an easy movement of the hook 23 by a user, in order to allow the mutual spacing apart of the containers 2.

Even more specifically, this recess 25 is positioned under a handle 6, which in turn is articulated to the respective container 2: this is found to be particularly practical in that while the operator grips and rotates the handle 6 of the first container 2 with one hand, in order to make it slide with respect to the container underneath, he or she can access the second portion 23*b* with the same hand (with just one finger) in order to deactivate the element 10 (in order to make the hook 23 turn) and allow the decoupling.

Figure 2:
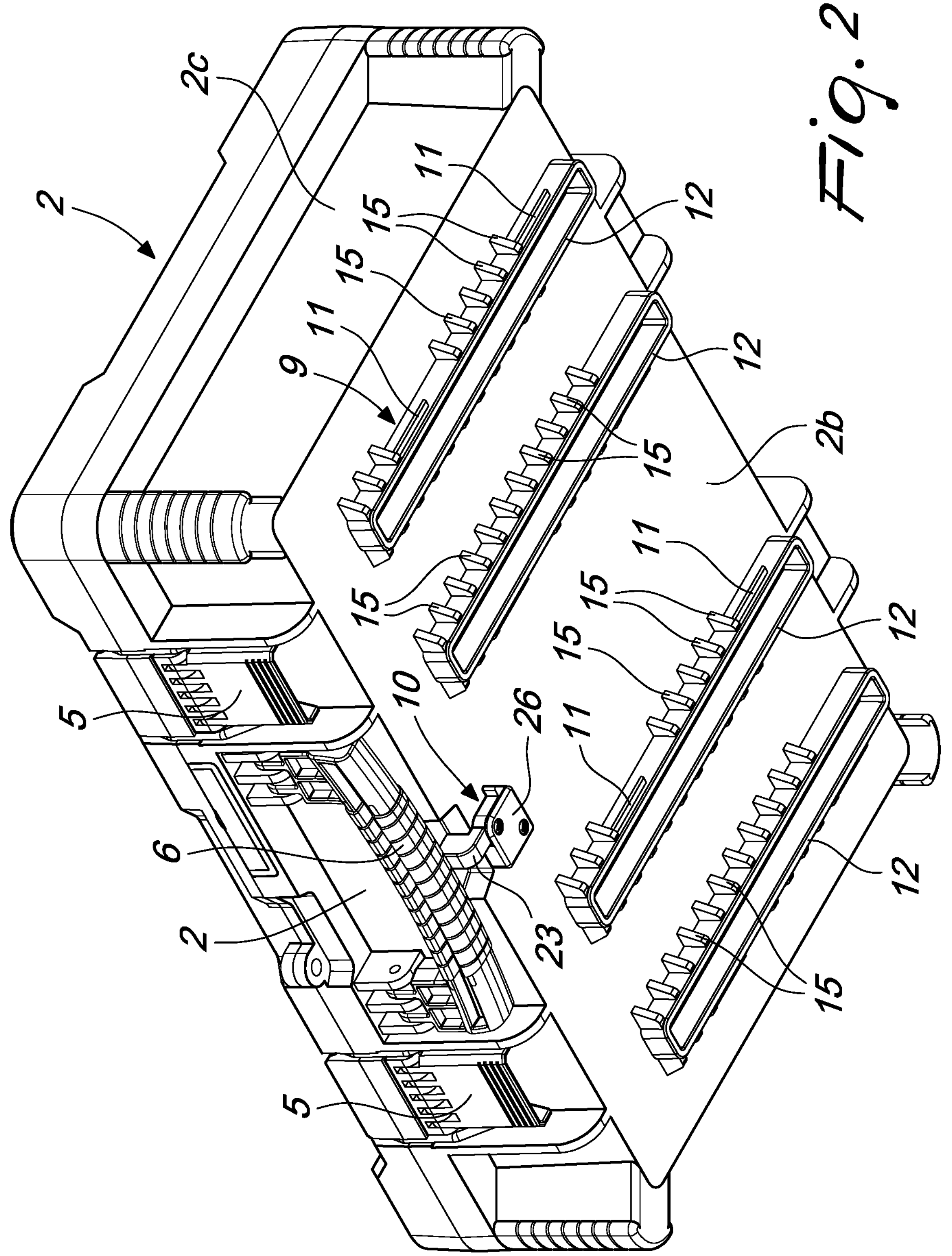
Figure 3:
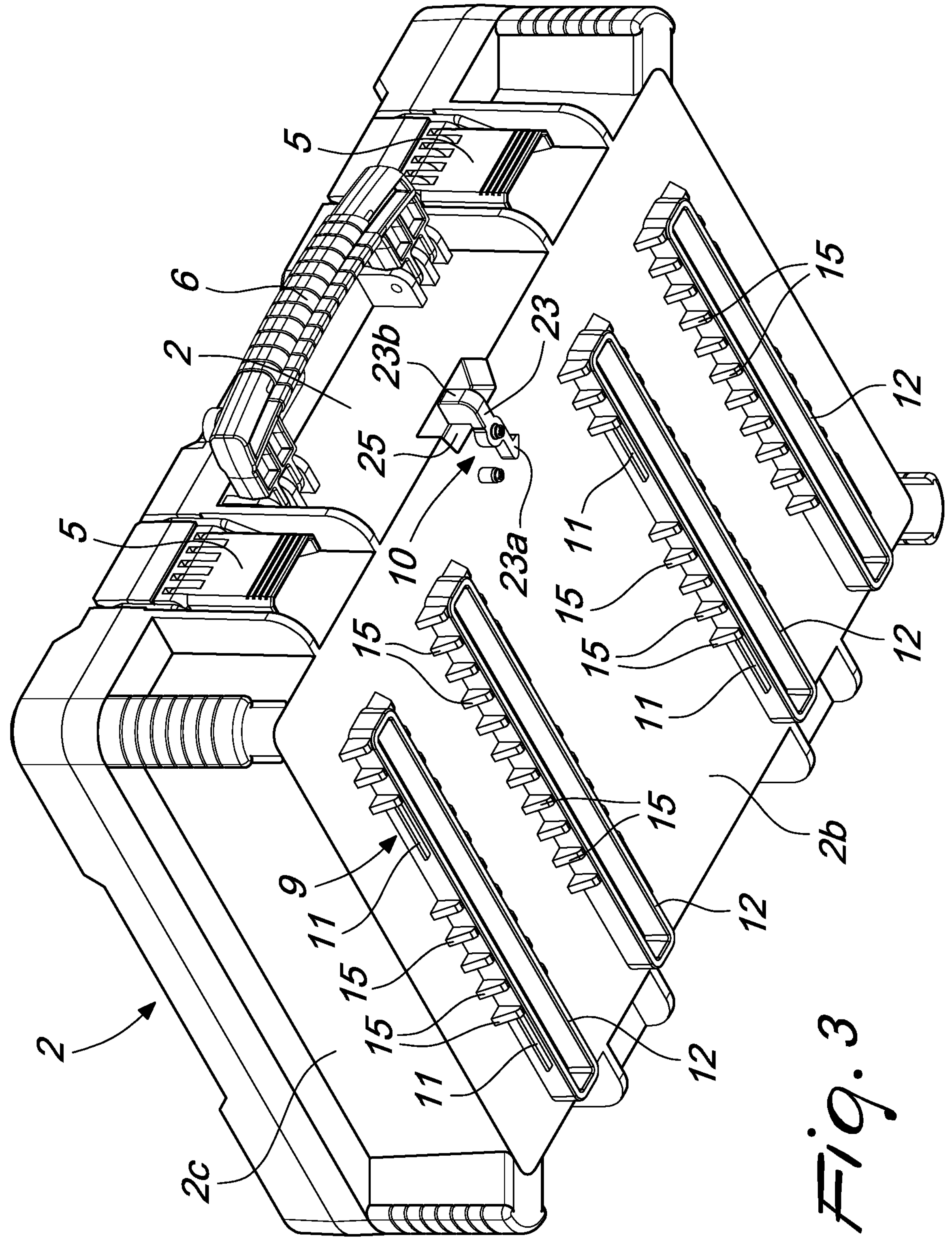
Figure 4:
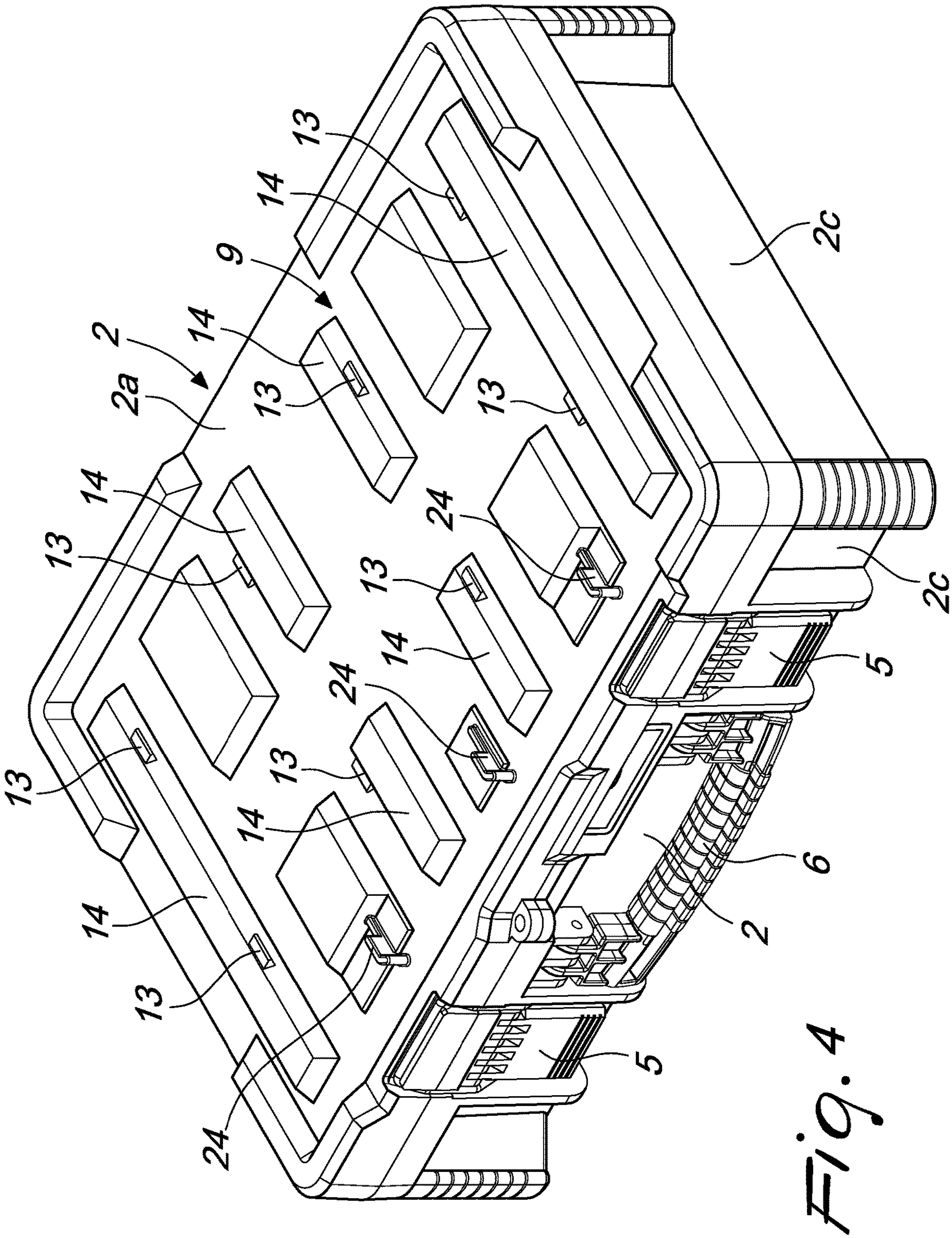
Figure 5:
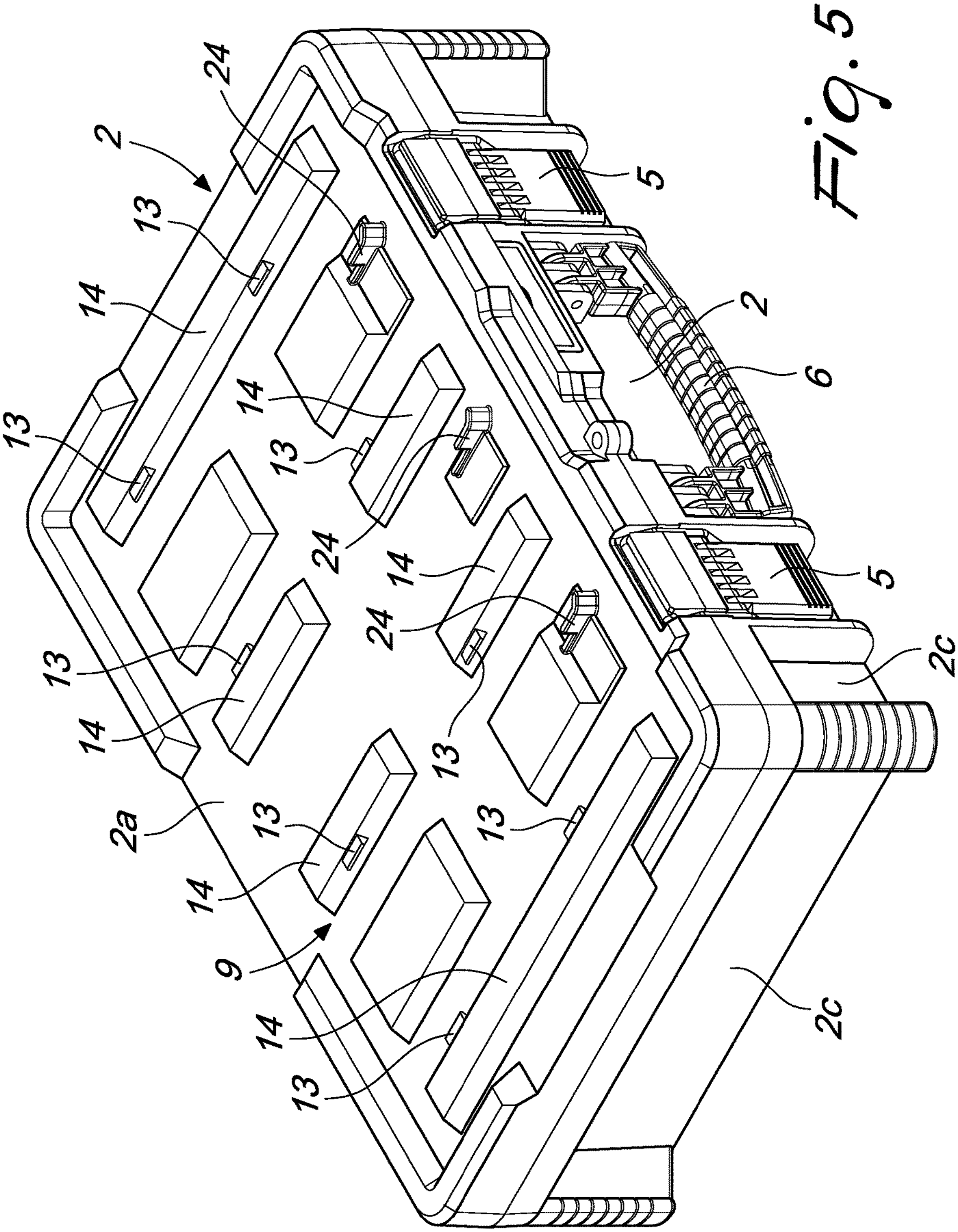
Figure 6:
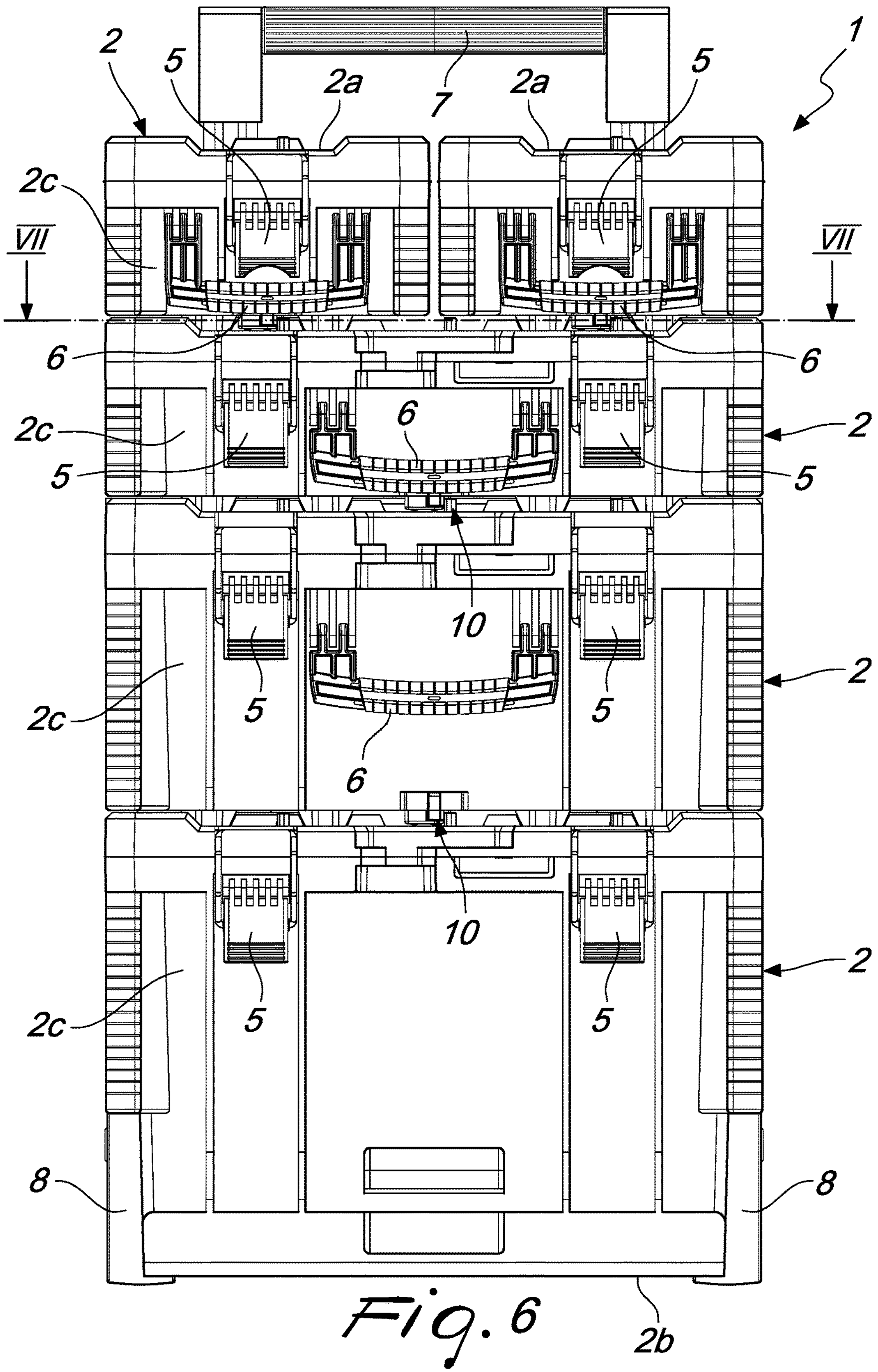
Figure 7:
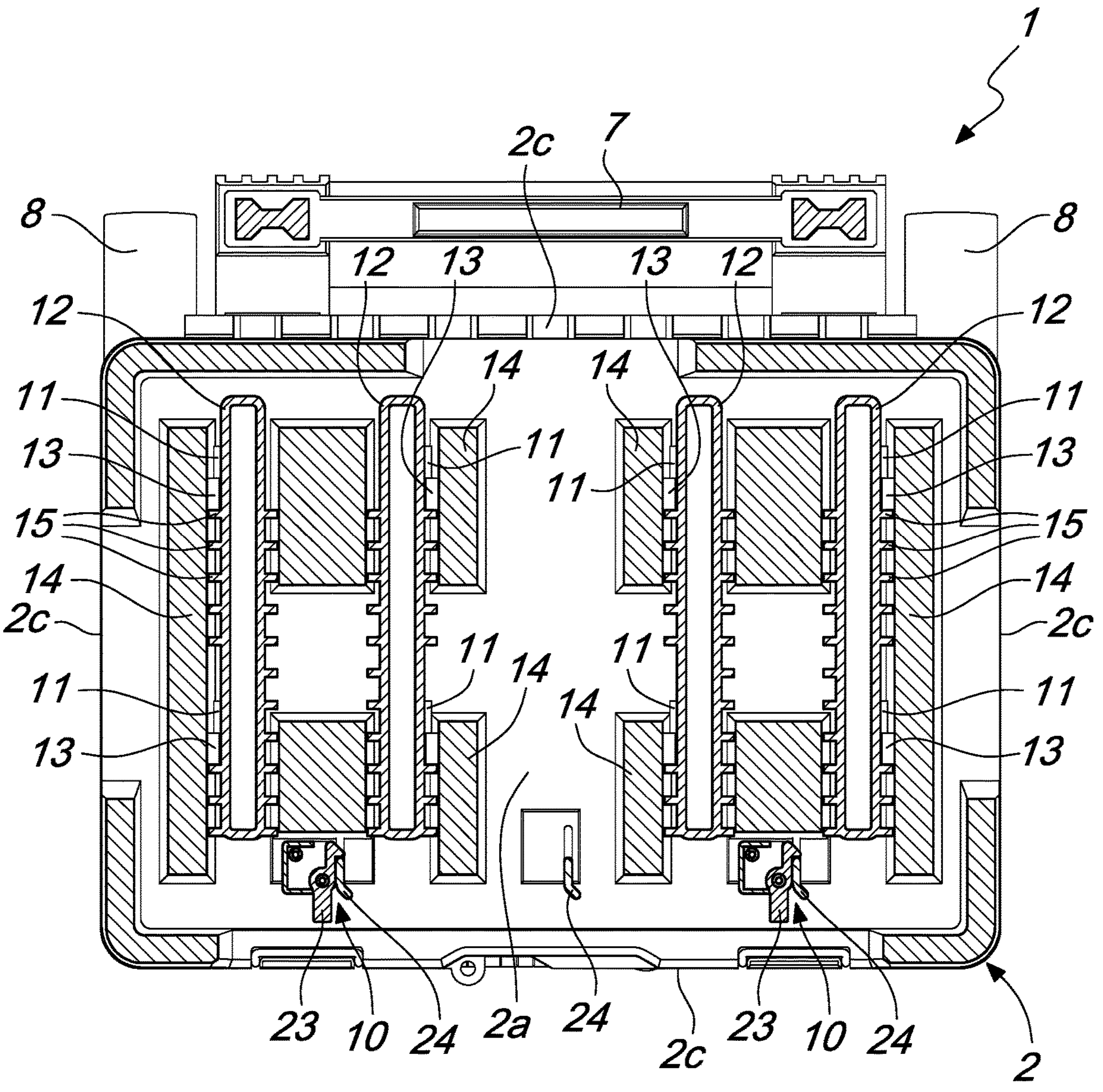
Figure 8:
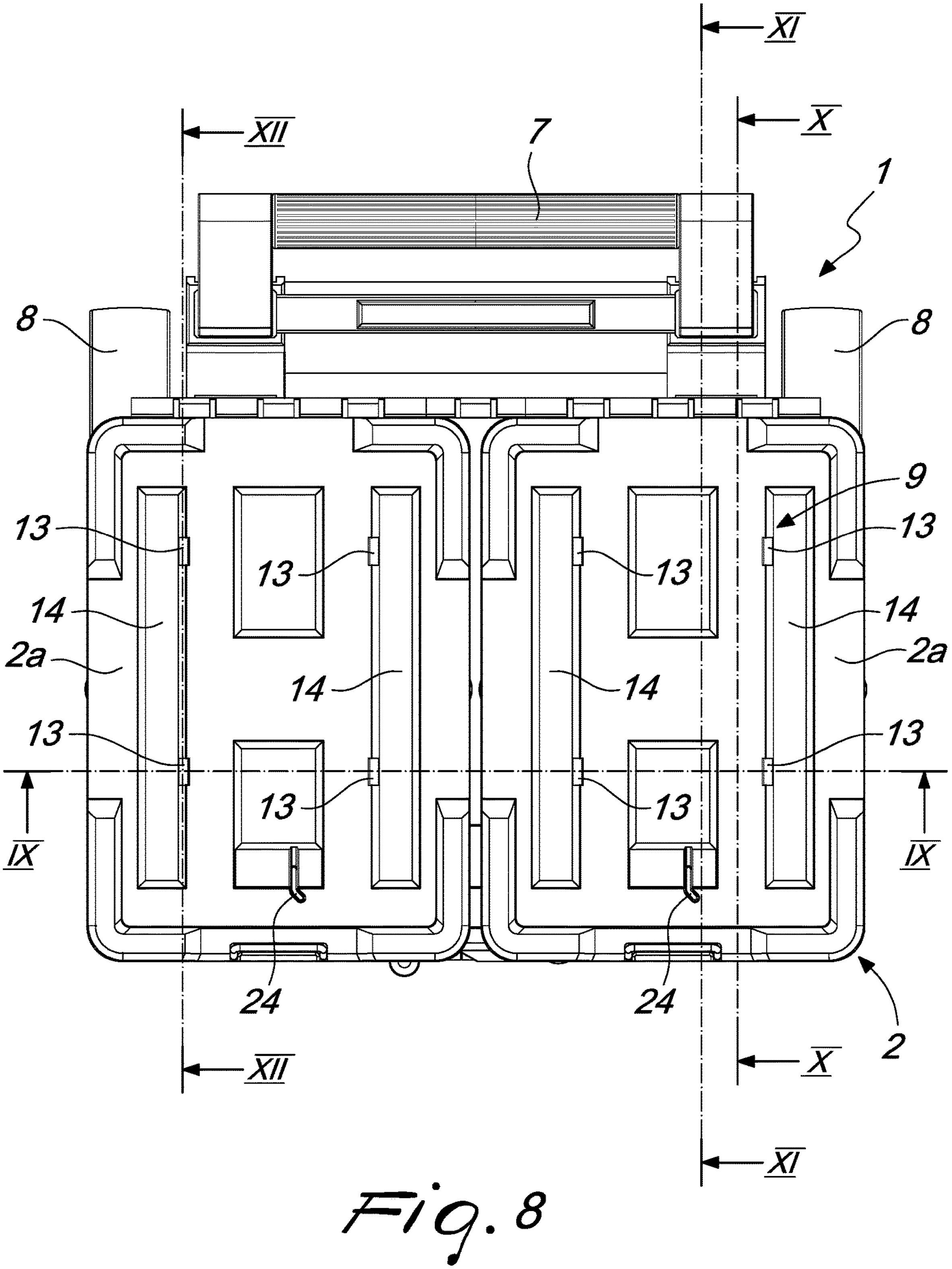

For the sake of clarity, the reference numerals of the first portion 23*a*, of the second portion 23*b* and of the recess 25 are given where present only in FIG. 3 (where in order to best illustrate the hook 23 a protective plate 26, visible and indicated in FIG. 2, has been removed), 14 and 23.

The use of the hook 23 is found to be particularly advantageous when the system 9 includes the ledges 11, 13, in that the movement that allows the superimposition of the latter (as already described in the foregoing pages) is also the movement just described, which obtains the mutual engagement between the hook 23 and the projection 24.

In a second implementation solution (adopted in the embodiment of FIGS. 24-29), the element 10 comprises (or is constituted by) a slideable tooth 27, which can translate at right angles to the lid 2*a* and to the bottom 2*b* of a respective container 2 (therefore parallel to the first axis A) in a cavity 28 (provided in the thickness of the corresponding half-shell and) open at either the bottom 2*b* of the first container 2 or the lid 2*a* of the second container 2.

In the stacking configuration, the slideable tooth 27 is elastically kept resting on a respective protruding lip 29, which extends from the other of either the bottom 2*b* of the first container 2 or the lid 2*a* of the second container 2, in order to obstruct the mutual spacing apart of the containers 2 along the third axis C, in at least one direction of mutual spacing apart.

The elastic reaction is for example ensured by a second spring 30, accommodated in turn in the cavity 28 and chosen to be of any type (including the conventional type): the second spring 30 normally keeps the slideable tooth 27 protruding outward (preferably from the bottom 2*b* of the respective container 2).

As can be seen clearly from the accompanying figures, preferably the lip 29 is constituted by a raised edge of the lid 2*a* (and even more preferably by the front edge, overlying the main handle 6 and opposite from the hinge 4).

In the operation of the slideable tooth 27, as with the hook 23, the user places the first container 2 on the second, keeping them offset (with respect to the third axis C): in this arrangement (different therefore to the active arrangement), the slideable tooth 27 protrudes from the bottom 2*b* into empty space, staying outside the bulk of the underlying second container 2 and distant from the lip 29.

Figure 29:
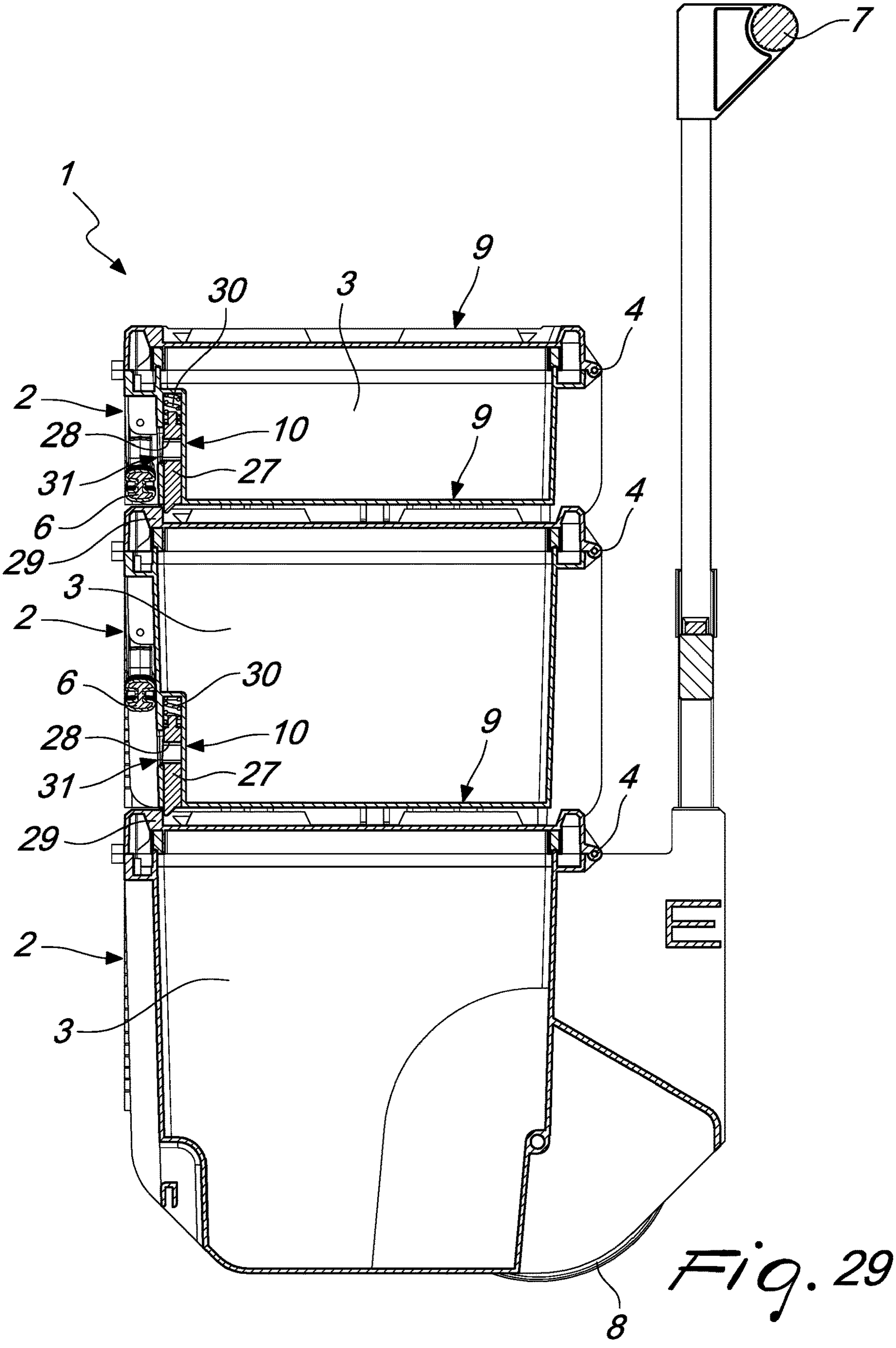
Figure 30:
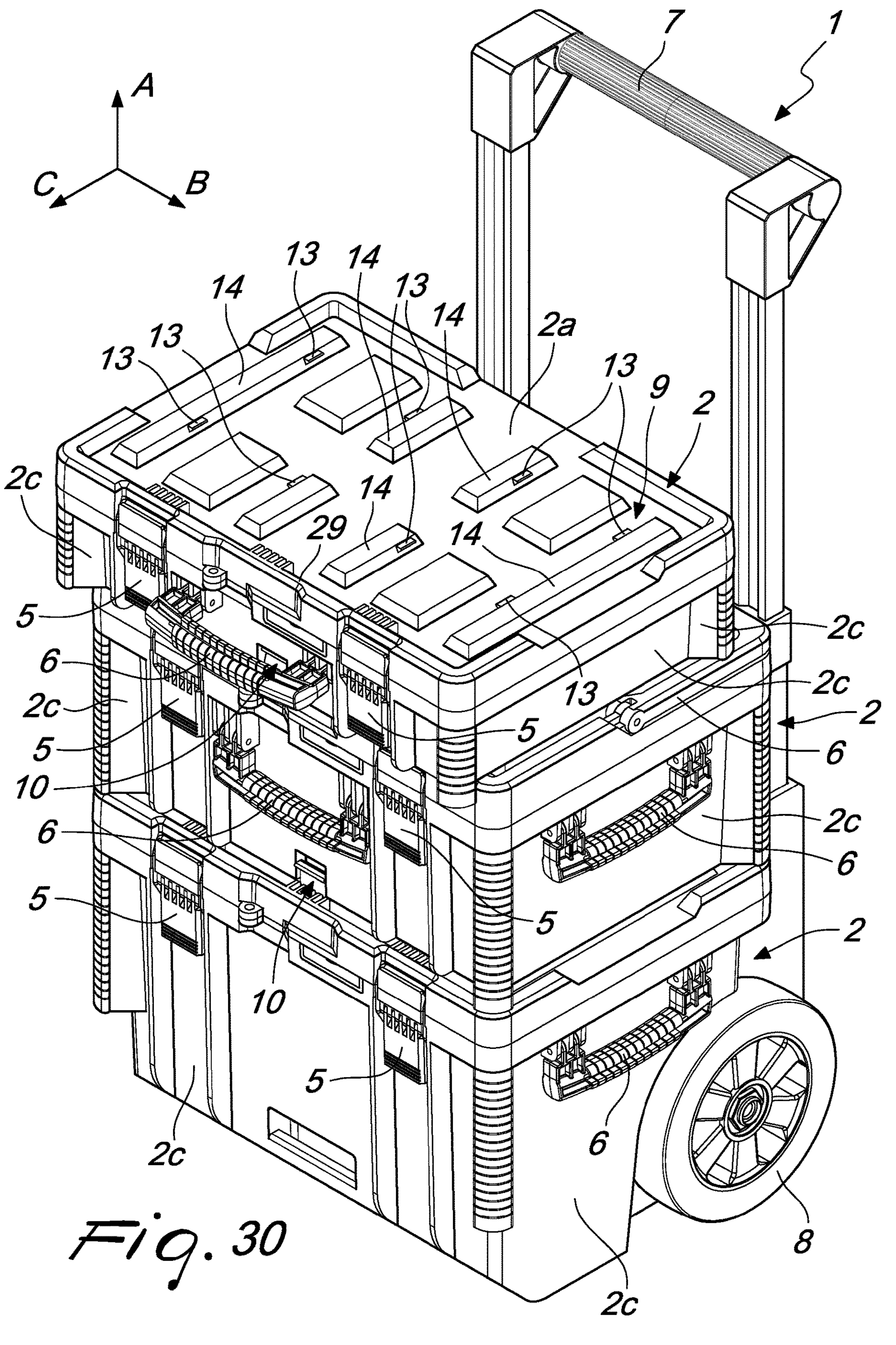
FIGS. 30 to 36 are views of the set according to the disclosure, in the fourth embodiment, more specifically.
Figure 31:
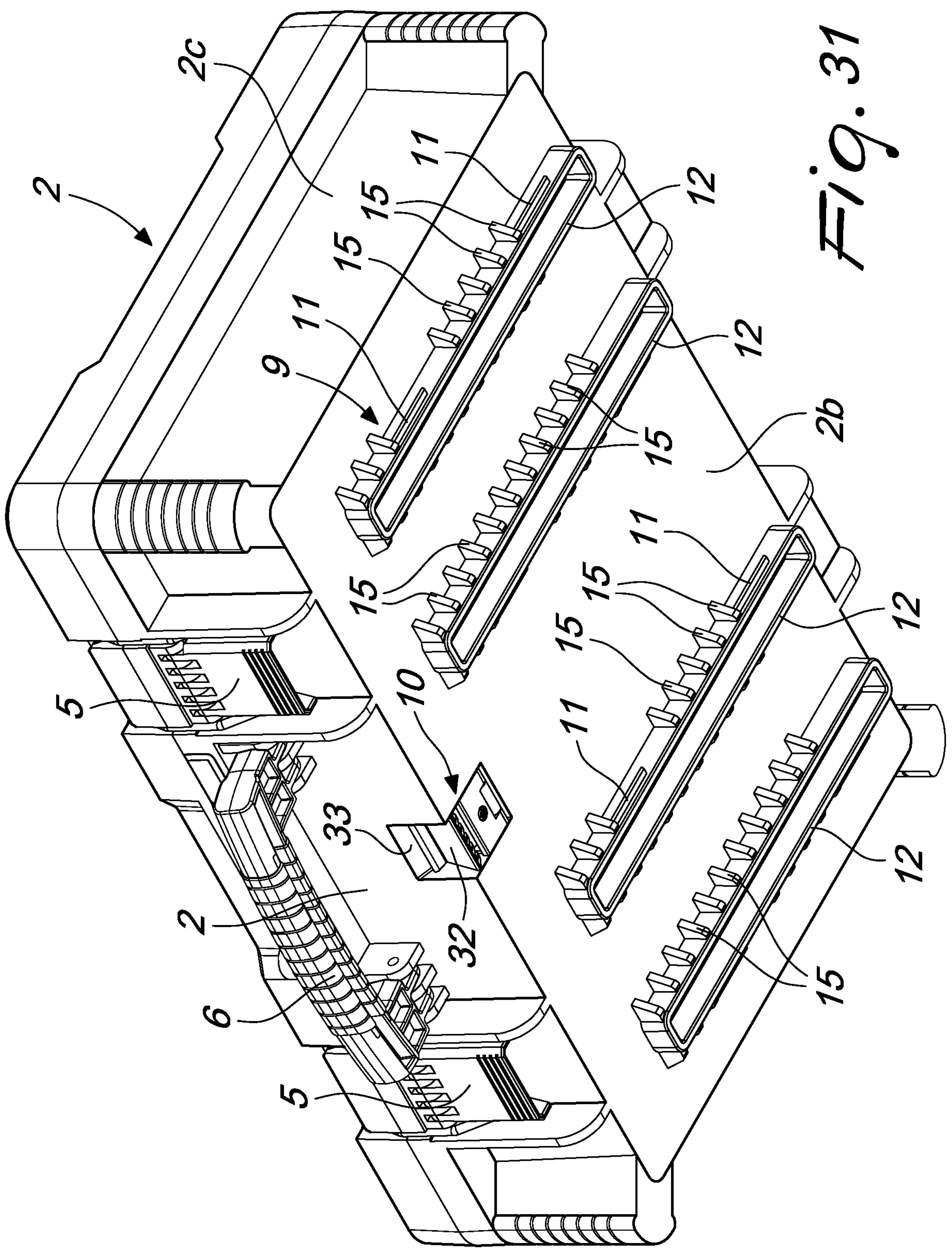
Figure 32:
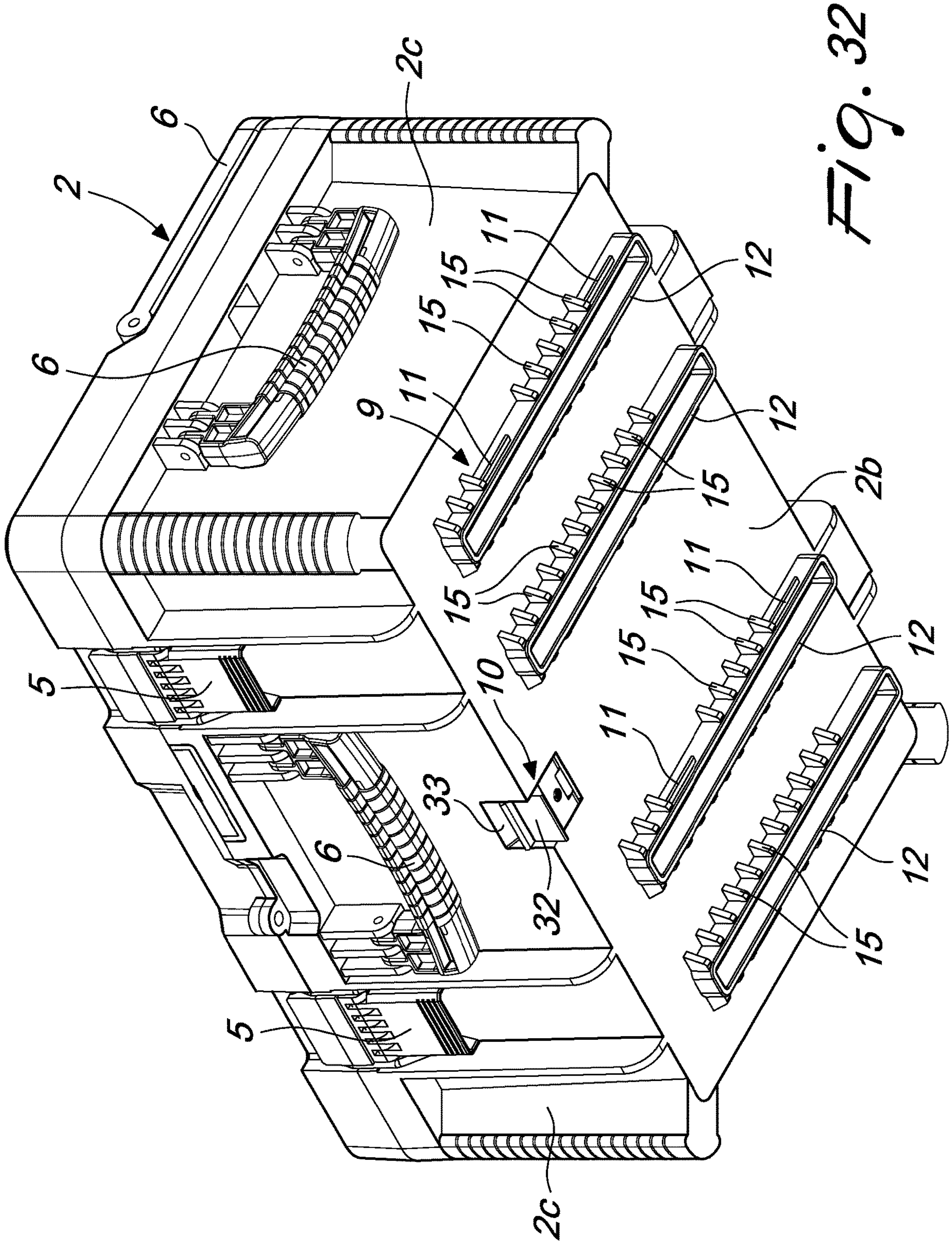
Figure 33:
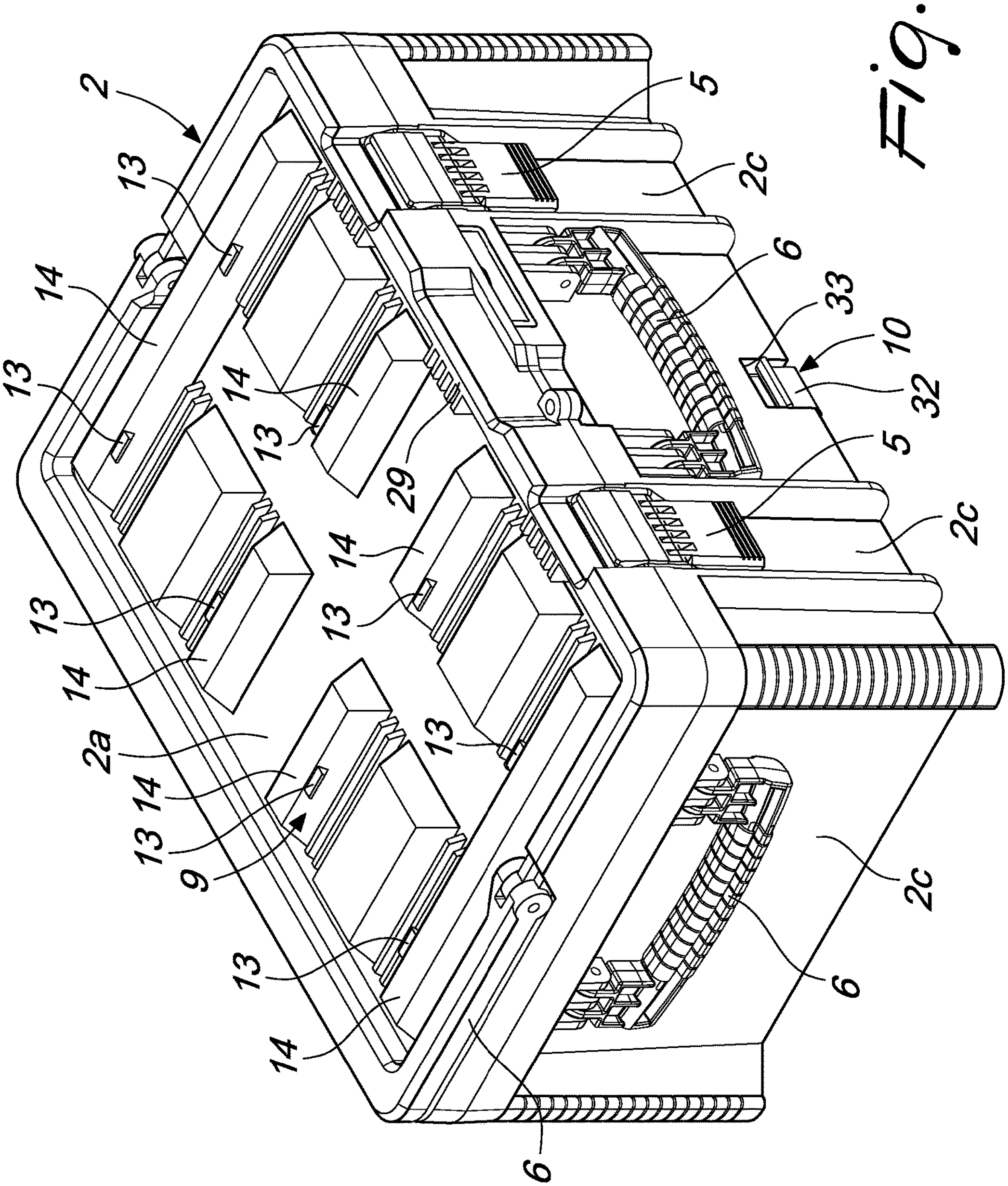
Figure 34:
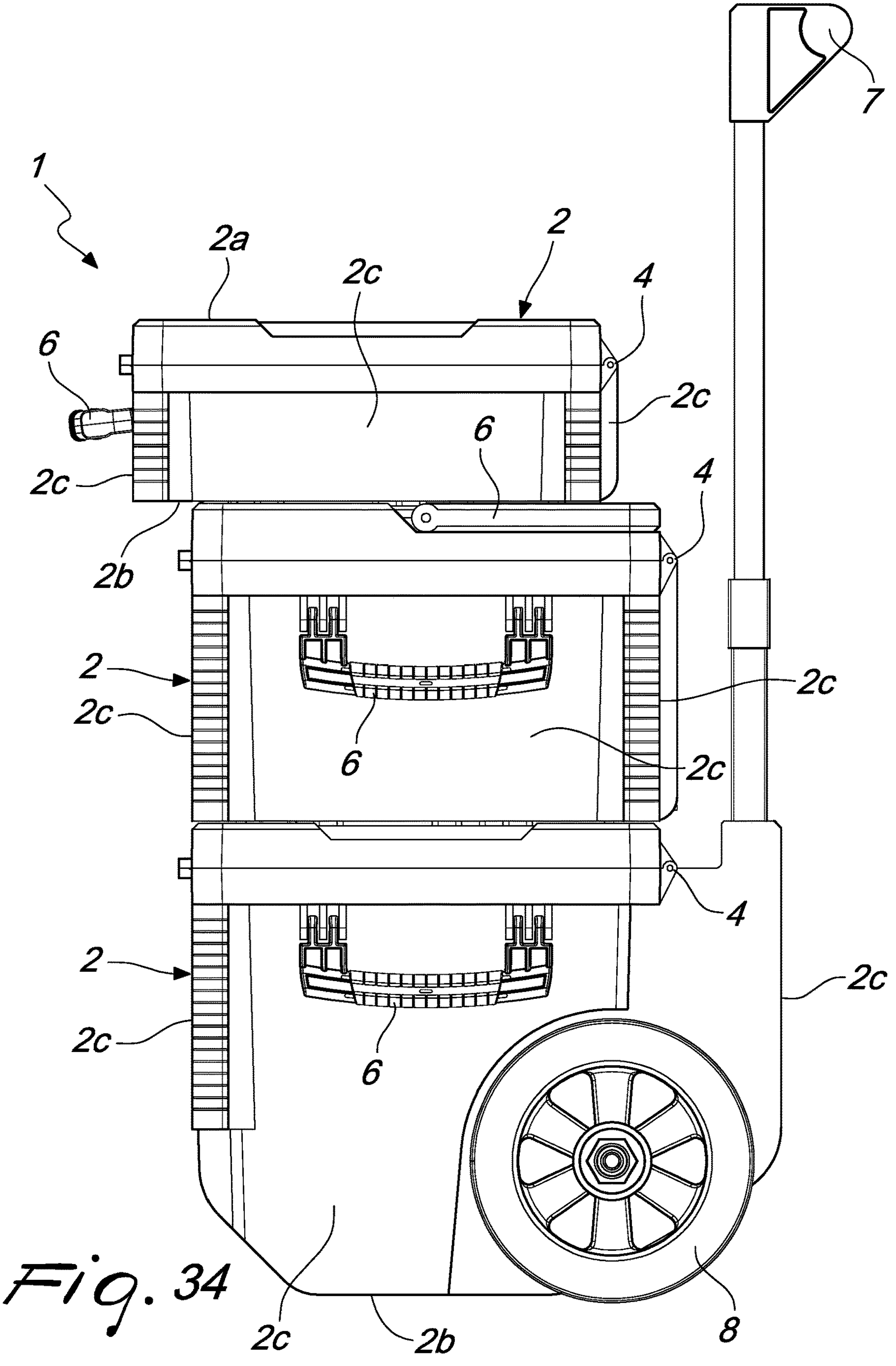
Figure 35:
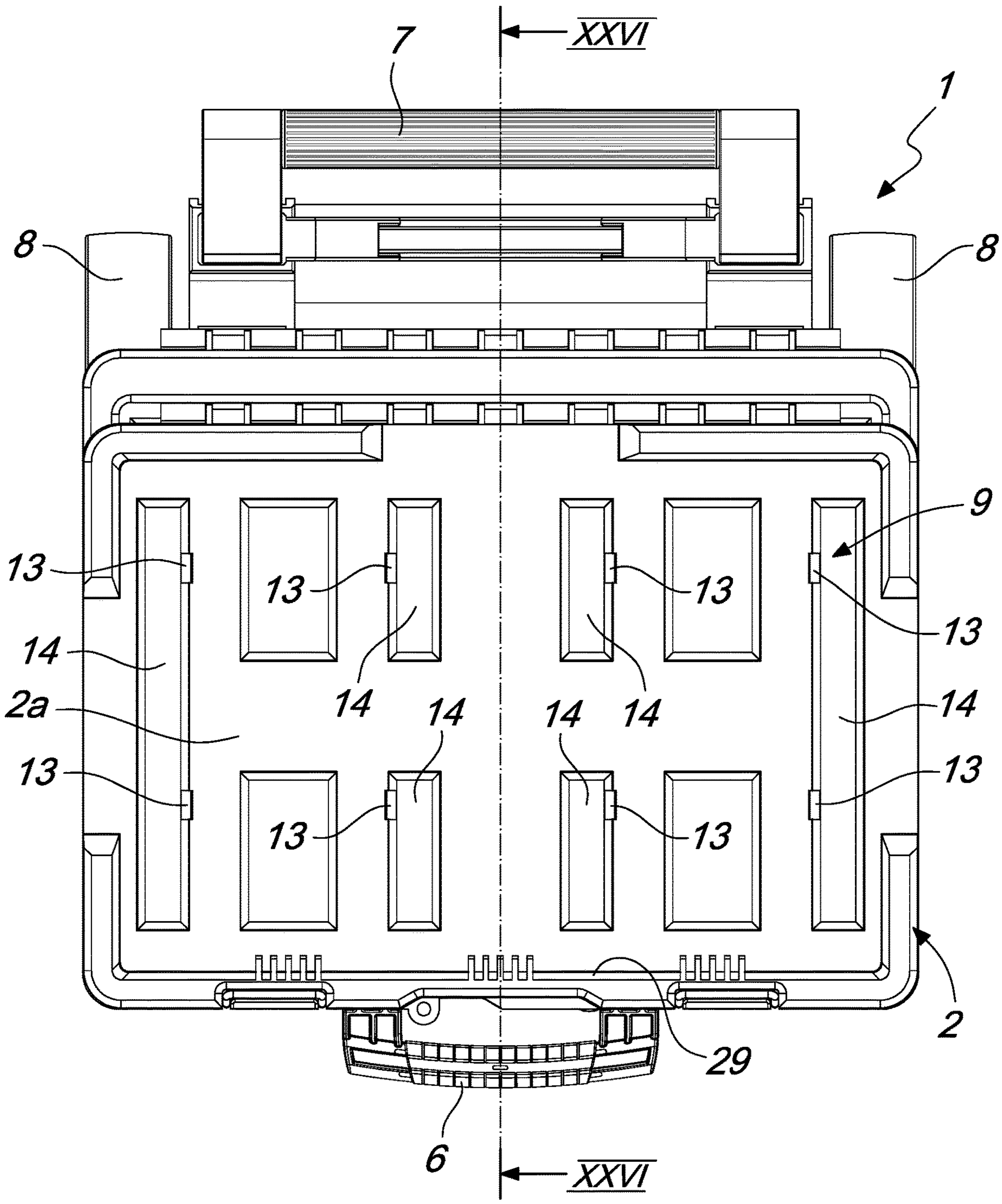
Figure 36:
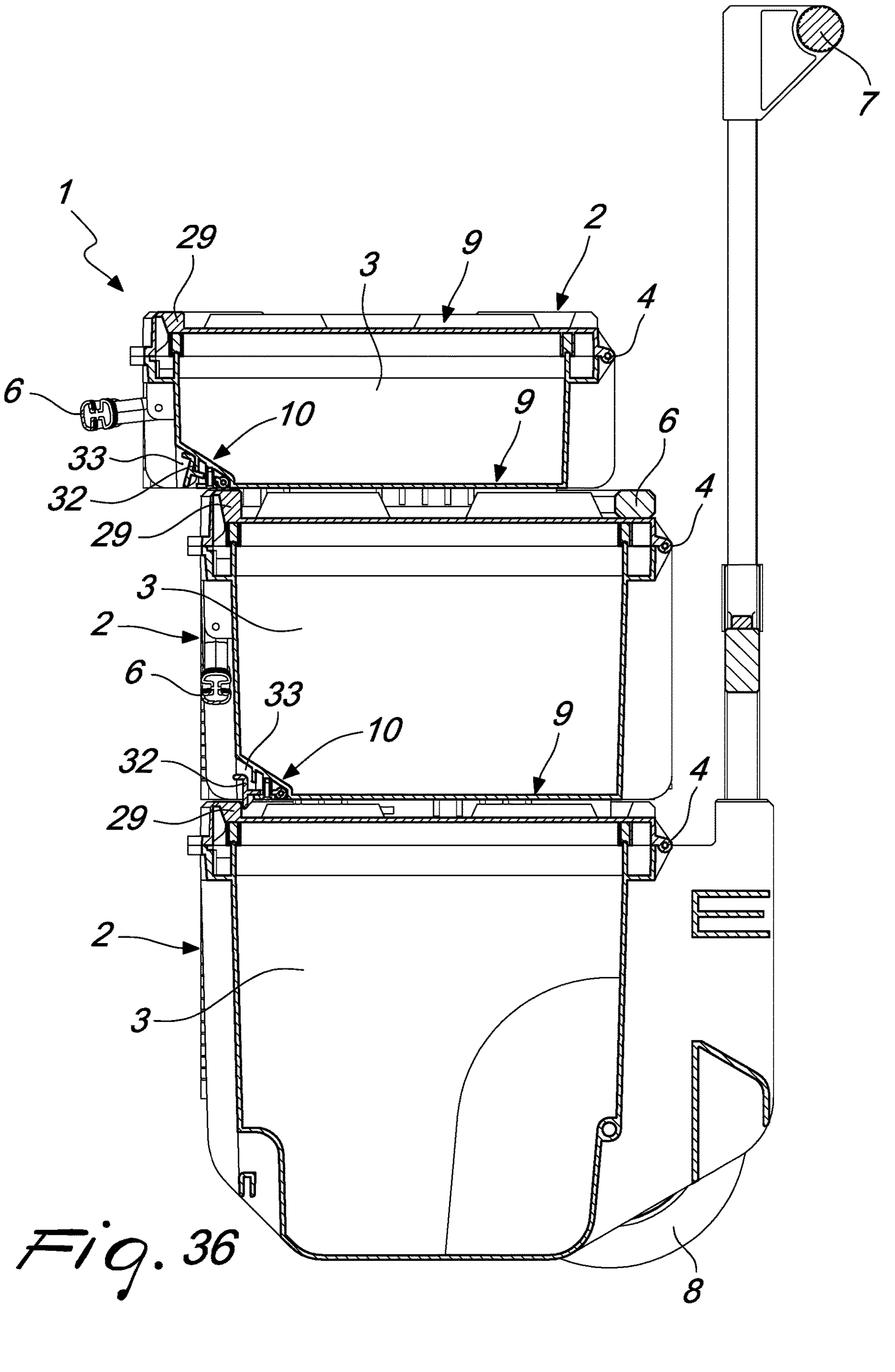
Figure 37:
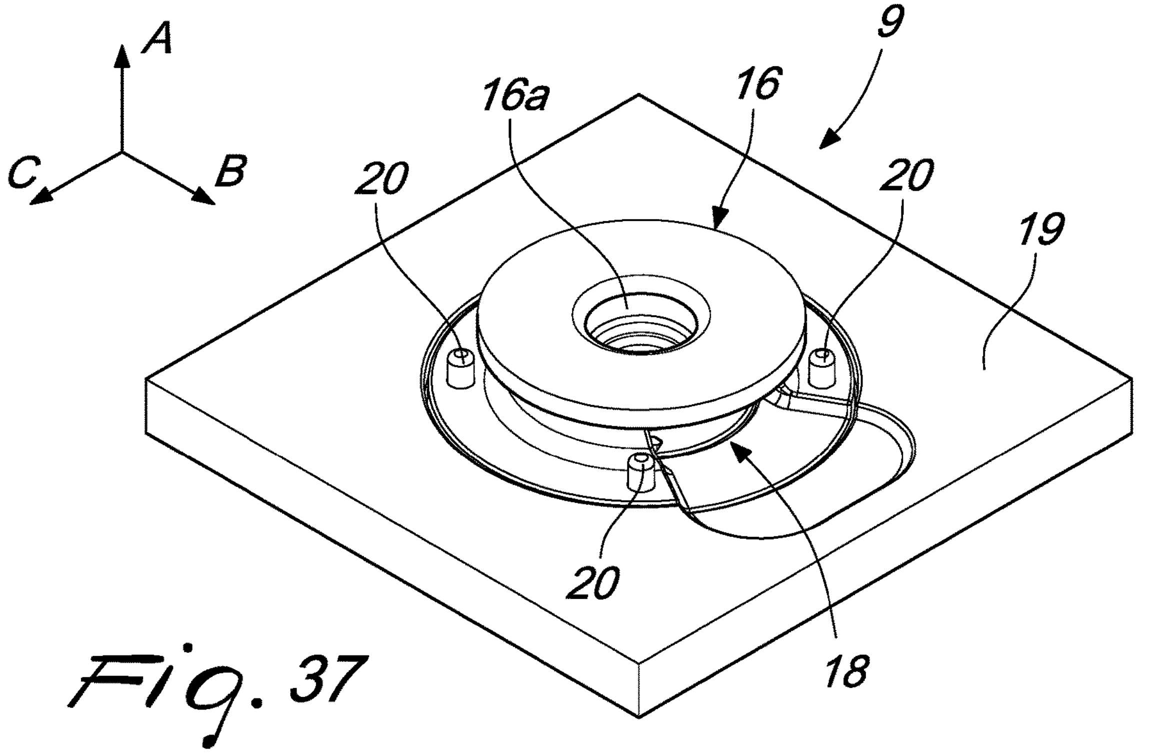
FIGS. 37 to 44 are views of some components of the means for retention, in a fifth and in a sixth embodiment of the set according to the disclosure, more specifically.

When the first container 2 is made to slide on the second, along the third axis C, the slideable tooth 27 collides with the lip 29 and is lifted, withdrawing into the cavity 28, in order to then descend and return to the non-deformed configuration again after having "cleared" the lip 29, from then on opposing the subsequent spacing apart of the containers 2 (in the direction opposite to the direction followed up to now), as in FIG. 29. The slideable tooth 27 can therefore also be effectively combined with the solution that entails, for the system 9, the ledges 11, 13.

It should be noted that the condition of obstructing the translation can also be obtained by simply moving the containers 2 closer together along the first axis A, directly up until the active arrangement, just like when the system 9 uses the peg 16 and the bell 17, and therefore the embodiment that entails the slideable tooth 27 can be adopted in this latter case as well.

In particular, the cavity 28 is placed in communication with the outside (also) at a window 31 which is open along a side wall 2*c* of the respective container 2, in order to allow the movement of the slideable tooth 27 by a user, in order to allow the mutual spacing apart of the containers 2.

As can be seen from the accompanying figures, and with purposes similar to those described previously for the recess 25, the window 31 is preferably located under a handle 6.

In a third implementation solution (adopted in the embodiment of FIGS. 30-36), the element 10 comprises (or is constituted by) a rocking tooth 32, articulated to either the bottom 2*b* of the first container 2 (preferably) or the lid 2*a* of the second container 2 about a rotation axis parallel to the second axis B.

The rocking tooth 32 therefore moves on an ideal plane at right angles to the bottoms 2*b* and to the lids 2*a* and is arranged along the third axis C. In the stacking configuration, the rocking tooth 32 is elastically kept resting on a respective protruding lip 29, which extends from the other of either the bottom 2*b* of the first container 2 or the lid 2*a* of the second container 2, so as to obstruct the mutual spacing apart of the containers 2 along the third axis C, in at least one direction of mutual spacing apart.

The elastic interference can be maintained by a third spring, chosen to be of any type, not shown for simplicity in the figures but chosen also to be of conventional type. The lip 29 can be the same one already described for the slideable tooth 27.

More specifically, the rocking tooth 32 is articulated with an end portion thereof to the respective container 2 and elastically rocks in a receptacle 33 provided along a corner edge of the container 2, which can be accessed from outside in order to allow the movement of the rocking tooth 32 by a user, in order to allow the mutual spacing apart of the containers 2.

The operation of the rocking tooth 32 is similar to that of the slideable tooth 27, just as the purposes are the same as in the previous case, such that, preferably, the receptacle 33 (and therefore the rocking tooth 32) is arranged at the main handle 6. We will not dwell further on the operation, it being perceivable by the person skilled in the art.

It is noted solely that in the accompanying FIGS. 30-36, on the container 2 at the top of the stack the handle 6 has been rotated precisely in order to simulate the action of the user who grips it. Likewise, on this container 2 the rocking tooth 32 has been rotated in order to illustrate how it moves, but in practice the rotation will happen only when the rocking tooth 32 actually collides with the lip 29 (the raised edge of the underlying container 2).

The rocking tooth 32 can also be effectively combined with the solution that entails, for the system 9, the ledges 11, 13 or the peg 16 and the bell 17.

In an alternative embodiment of the disclosure, which comprises neither the system 9 nor the element 10 and which is shown schematically in FIGS. 45-48, the means for the mutual retention comprise two laminas 34 arranged so as to close at least partially respective hollows 35 provided along respective mutually opposite side walls 2*c*, which here are therefore defined as active, of the first container 2. Each lamina 34 is articulated with a respective central flap to the corresponding active side wall 2*c*, about a rotation axis parallel to the active side walls 2*c* and to the bottom 2*b*, so as to be able to rotate about this rotation axis in the hollow 35.

In the non-deformed configuration, preferably maintained by a respective fourth spring, chosen to be of any type (including conventional) and not shown in the figures for the sake of simplicity, each lamina 34 is aligned with the profile of the respective side wall 2*c*.

Furthermore, each lamina 34 has a curved rim 34*a*, which is elastically engageable in the stacking configuration with a groove 36 (FIG. 48) provided along corresponding side walls 2*c* of the second container 2. It is possible for each container 2 to have laminas 34 and grooves 36 (so as to be able to act equally as a first or as a second container 2), or only the former or only the latter.

Figure 46:
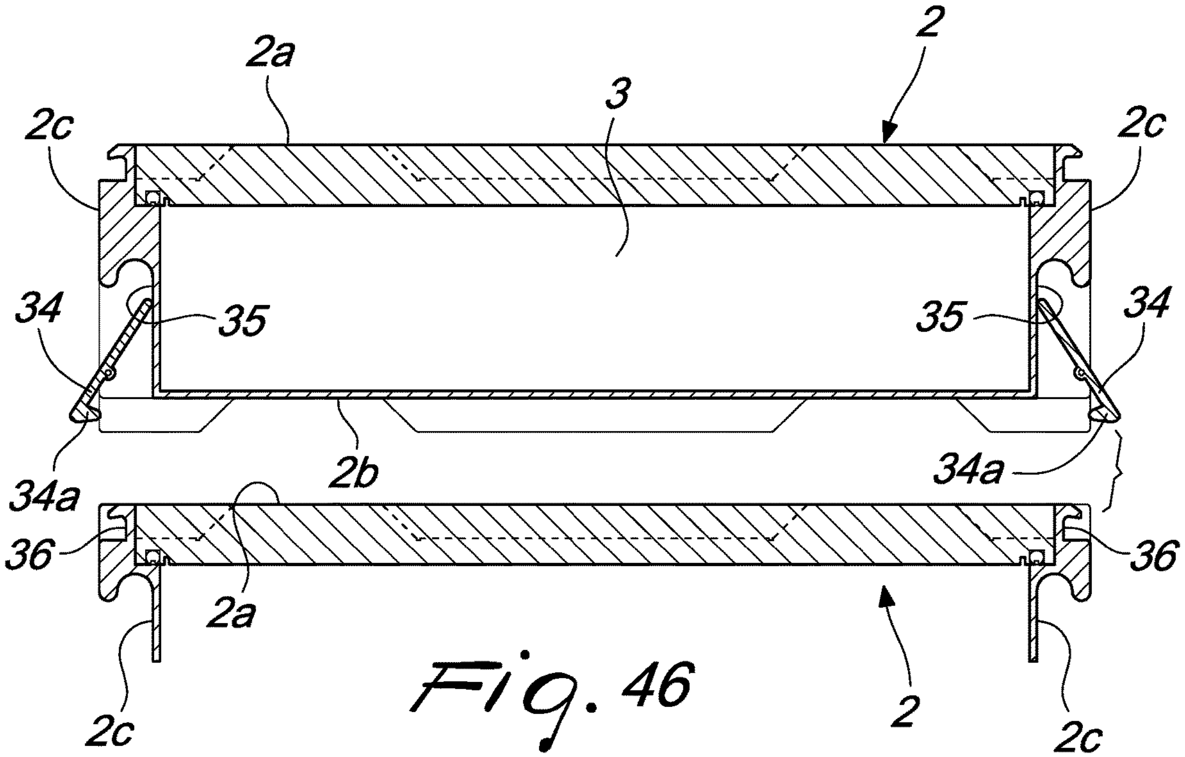
Figure 47:
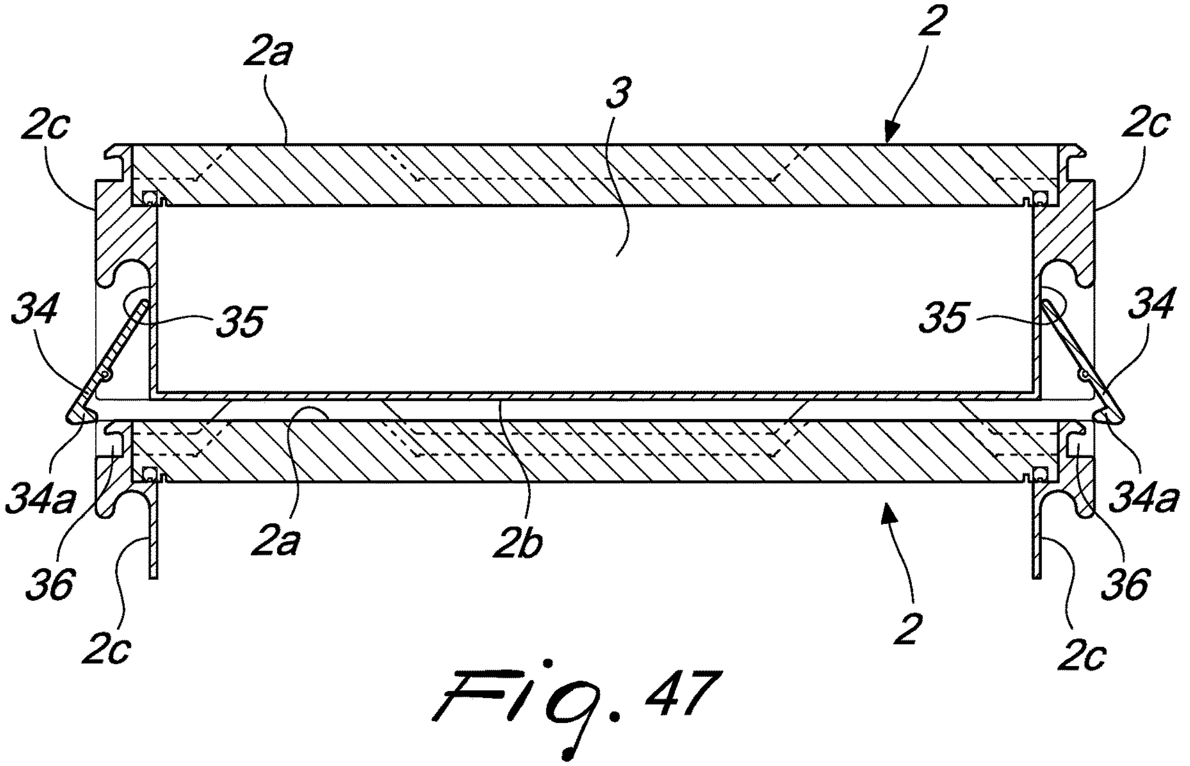
Figure 48:
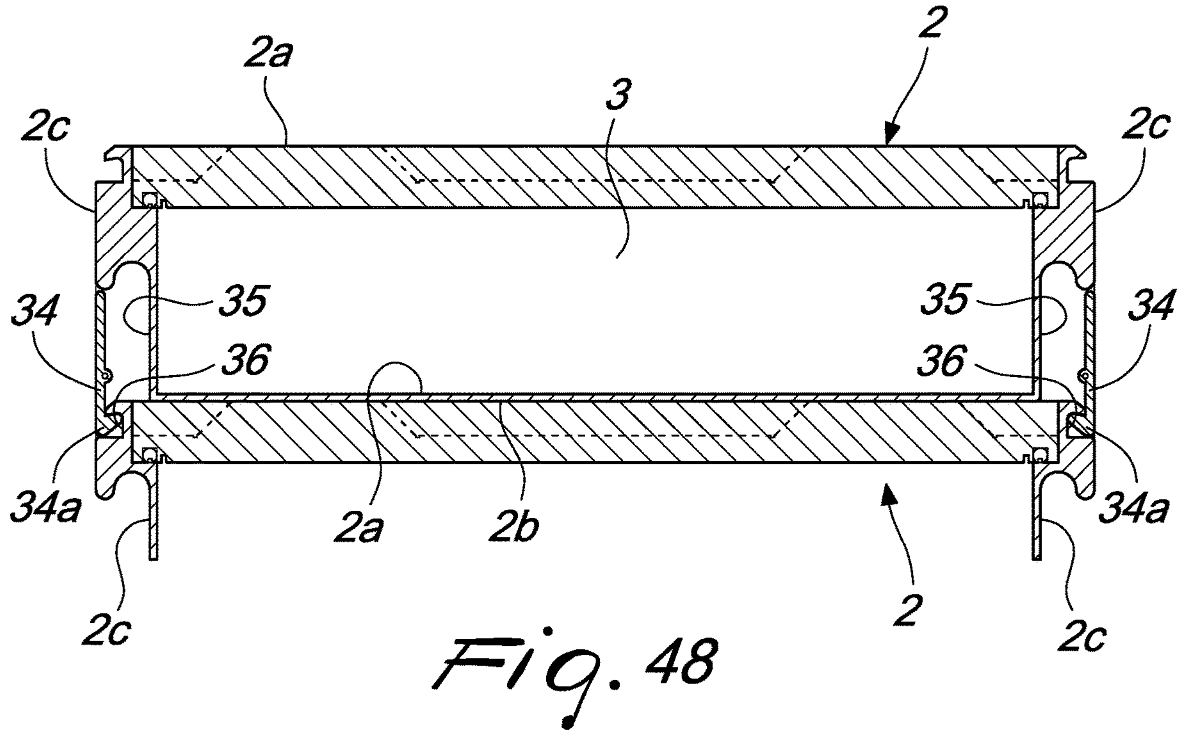

FIGS. 45-48 show the containers 2 only schematically, in that, apart from what can be seen, they can be chosen to be conventional (or like those of the other embodiments already described). Furthermore, these figures show the sequence of stacking the containers 2: starting from the non-deformed (and spaced apart) configuration of the containers 2 (FIG. 45) it is sufficient to grasp the first container 2 at the laminas 34 (making them rotate and inserting the hands into the hollows 35) and then place the first container 2 on the second, in perfect alignment (the active arrangement) (FIGS. 46 and 47). The user can then release the laminas 34, which return to the non-deformed configuration, allowing the curved rim 34*a* to clamp the second container 2 at the grooves 36, thus achieving the desired mutual retention (FIG. 48).

As can be seen from the figures, (at least) the bottom 2*b* and the lid 2*a* respectively of the first container 2 and of the second container 2 can have mutually complementary shapes, in order to consolidate the coupling.

To uncouple the containers 2, it is sufficient to carry out the reverse operation to stacking, again inserting the hands into the hollows 35 and making the laminas 34 rotate, in order to disengage the curved rim 34*a* and so be able to lift the first container 2.

The operation of the set according to the disclosure has been described in detail previously, for the different embodiments.

In any case, independently of the specific choices made and of the embodiment adopted, the set 1 fully achieves the set aim, in that the means for the mutual retention, which are activated in the stacking configuration, in fact ensure a practical stacking of the containers 2, clamping them together and enabling the joint transport thereof in a practical and easy manner.

The mutual coupling is achieved between each pair of adjacent containers 2 and therefore the stack produced is absolutely stable, with no possibility of small oscillations or relative sliding, as happens with the conventional solutions.

Moreover, differently from what occurs in fact with some conventional solutions, the coupling does not involve complicated windings with belts or films, but can be activated automatically or in any case easily with the simple placing of each first container 2 on the respective second container 2.

Evidently, this choice ensures maximum repeatability and at the same time practical methods of disengagement (even only temporary) of even just one container 2, if circumstances require it.

The means for retention can easily operate on containers 2 of different dimensions, thus ensuring maximum versatility for the disclosure.

The simplicity of implementation ensures reliability of operation, even over time, and at the same time it ensures economy and simplicity of assembly.

The disclosure, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The invention claimed is:

1. A set of transportable containers, comprising at least two transportable containers, and further comprising retention means configured for mutual retention of said containers, which are configured to be actuated in at least one stacking configuration wherein a bottom of a first said container is rested in parallel on a lid of a second said container in a specific mutual and active arrangement, said retention means configured for mutual retention being selectively deactivatable to allow a separation of said containers, wherein said retention means for mutual retention comprise at least:

- a mutual coupling system activatable in said stacking configuration and configured to obstruct the separation of said containers along a first axis, at right angles to said bottoms and to said lids, and a second axis, at right angles to said first axis; and
- a selective locking element activatable in said stacking configuration and configured to obstruct the separation of said containers along a third axis, at right angles to said first axis and to said second axis, said selective locking element being selectively deactivatable to allow the separation of said containers along said third axis, wherein said selective locking element comprises a hook, articulated to either said bottom of said first container or said lid of said second container about a rotation axis at right angles to said lid and to said bottom of the respective said container, in said stacking configuration said hook being elastically kept engaged with a respective projection extending from another of either said bottom of said first container or said lid of said second container, in order to obstruct the separation of said containers along said third axis in at least one direction of separation.

2. The set according to claim 1, wherein said system comprises first ledges which protrude transversely from respective first protrusions which extend from said bottom of said first container and second ledges which protrude transversely from respective second protrusions which extend from said lid of said second container, said first protrusions being arranged adjacent said second protrusions in said stacking configuration, for the at least partial insertion of said first ledges between said second ledges and said lid of said second container, with consequent mutual coupling of said containers.

3. The set according to claim 2, wherein said first protrusions and said second protrusions are distributed offset and parallel to said third axis.

4. The set according to claim 1, wherein said hook has a central portion articulated to the respective said container and interposed between a first end portion comprising a barb shape configured to engage said projection, and a second end portion, facing outward at a recess provided along a corner edge of said container, in order to allow the movement of said hook by a user, in order to allow the separation of said containers.

* * * * *